United States Patent
Popoff et al.

[11] Patent Number: 6,053,334
[45] Date of Patent: *Apr. 25, 2000

[54] FUEL FILTER WITH VALVE DEVICE

[75] Inventors: Peter Popoff; David H. Hodgkins, both of Modesto; Michael D. Clausen, Turlock; Russell D. Jensen; Walter H. Stone, both of Modesto; Victor A. Oelschlaegel, Oakdale, all of Calif.

[73] Assignee: Parker Hannifin Customer Support Inc., Irvine, Calif.

[*] Notice: This patent is subject to a terminal disclaimer.

[21] Appl. No.: 08/840,521

[22] Filed: Apr. 21, 1997

Related U.S. Application Data

[63] Continuation-in-part of application No. 08/150,709, Nov. 10, 1993, Pat. No. 5,643,446, and a continuation-in-part of application No. 08/731,114, Oct. 9, 1996, Pat. No. 5,770,065, which is a continuation of application No. 08/441,584, May 15, 1995, abandoned, which is a continuation of application No. 08/121,803, Sep. 15, 1993, abandoned.

[51] Int. Cl.[7] .................................................. B01D 35/02
[52] U.S. Cl. .................... 210/438; 210/493.2; 210/234
[58] Field of Search .................................... 210/234, 235, 210/430, 438, 450, 493.2, 457

[56] References Cited

U.S. PATENT DOCUMENTS

| | | |
|---|---|---|
| 1,407,763 | 2/1922 | Langston . |
| 1,468,906 | 9/1923 | Inman . |
| 1,746,336 | 2/1930 | Breer . |
| 2,071,529 | 2/1937 | Howard . |
| 2,304,618 | 12/1942 | Williams . |
| 2,431,782 | 12/1947 | Walton et al. . |
| 2,533,266 | 12/1950 | Kovacs et al. . |
| 2,544,244 | 3/1951 | Vokes . |
| 2,642,187 | 6/1953 | Bell . |
| 2,729,339 | 1/1956 | McCoy . |

(List continued on next page.)

FOREIGN PATENT DOCUMENTS

| | | |
|---|---|---|
| 570727 | 9/1958 | Belgium . |
| 824484 | 10/1969 | Canada ............................. 210/493.2 |
| 0 079 841 | 5/1983 | European Pat. Off. . |
| 0079841 | 5/1983 | European Pat. Off. . |
| 0 164 548 | 12/1985 | European Pat. Off. . |
| 0164548 | 12/1985 | European Pat. Off. . |
| 0 260 069 | 3/1988 | European Pat. Off. . |
| 0260069 | 3/1988 | European Pat. Off. . |
| 0 289 188 | 11/1988 | European Pat. Off. . |
| 0289188 | 11/1988 | European Pat. Off. . |
| 0426064 | 5/1991 | European Pat. Off. . |
| 0532161 | 5/1991 | European Pat. Off. . |
| 0483119 | 4/1992 | European Pat. Off. . |
| 686520 | 7/1930 | France . |
| 1909130 | 2/1969 | Germany . |
| 1915923 | 10/1970 | Germany . |
| 3249144 | 3/1986 | Germany . |

(List continued on next page.)

*Primary Examiner*—Matthew O. Savage
*Attorney, Agent, or Firm*—Christopher H. Hunter

[57] ABSTRACT

A fuel filter comprises a head (96) having an inlet (100) and an outlet (102). The head is connection to an element (266) by a nipple portion (186) which has a valve element (196) therein. An actuating projection (222, 272) is engageable with said valve element to open flow through said nipple portion when the correct element is attached hereto. The actuating projection is further supported on a central portion (220, 276) which prevents connection to a nipple portion that extends too far into the element. According to a further embodiment, the filter includes a housing (412) with a removable element (424) mounted therein. The housing has an inlet port (414) in direct fluid communication with a chamber (418). The outlet port (416) is in direct fluid communication with a central standpipe (422). The standpipe has a flow element (442) movable therein for controlling the condition of flow openings (436) in the standpipe. The cover further includes a cover projection (482) for supporting a projection (478) on end cap (460) of the filter element, which opens flow into the standpipe only when the element is installed.

11 Claims, 23 Drawing Sheets

U.S. PATENT DOCUMENTS

| | | |
|---|---|---|
| 2,858,026 | 10/1958 | Lorimer . |
| 3,000,505 | 9/1961 | Scavuzzo . |
| 3,021,955 | 2/1962 | Joyce . |
| 3,029,836 | 4/1962 | Gruner . |
| 3,040,894 | 6/1962 | Pall . |
| 3,056,503 | 10/1962 | Roosa . |
| 3,070,232 | 12/1962 | Casaleggi . |
| 3,105,042 | 9/1963 | Roosa . |
| 3,151,071 | 9/1964 | Kasten . |
| 3,198,336 | 8/1965 | Hyslop ................................ 210/457 |
| 3,216,571 | 11/1965 | Whiting et al. . |
| 3,232,437 | 2/1966 | Hultgren . |
| 3,363,762 | 1/1968 | Ensign . |
| 3,388,801 | 6/1968 | Boyd et al. . |
| 3,398,831 | 8/1968 | Jones . |
| 3,473,664 | 10/1969 | Hultgren . |
| 3,487,932 | 1/1970 | Forrester et al. . |
| 3,529,727 | 9/1970 | Bernhard . |
| 3,589,517 | 6/1971 | Palnai . |
| 3,591,007 | 7/1971 | Crowther . |
| 3,608,726 | 9/1971 | Crowther . |
| 3,931,011 | 1/1976 | Richards et al. . |
| 4,035,306 | 7/1977 | Maddocks . |
| 4,052,307 | 10/1977 | Humbert, Jr. . |
| 4,094,791 | 6/1978 | Conrod . |
| 4,139,468 | 2/1979 | Rosaen . |
| 4,237,015 | 12/1980 | Fearnhead . |
| 4,369,113 | 1/1983 | Stifelman . |
| 4,437,986 | 3/1984 | Hutchins . |
| 4,485,011 | 11/1984 | Cole et al. . |
| 4,508,621 | 4/1985 | Jackson . |
| 4,522,712 | 6/1985 | Fischer et al. . |
| 4,619,764 | 10/1986 | Church et al. . |
| 4,668,393 | 5/1987 | Stone . |
| 4,692,245 | 9/1987 | Church et al. . |
| 4,732,671 | 3/1988 | Thornton . |
| 4,836,923 | 6/1989 | Popoff et al. . |
| 4,906,365 | 3/1990 | Baumann et al. . |
| 4,959,141 | 9/1990 | Anderson . |
| 4,976,852 | 12/1990 | Janik et al. . |
| 4,997,555 | 3/1991 | Church et al. . |
| 5,017,285 | 5/1991 | Janik et al. . |
| 5,020,610 | 6/1991 | Lyon et al. . |
| 5,030,345 | 7/1991 | Thomas . |
| 5,049,269 | 9/1991 | Shah . |
| 5,071,456 | 12/1991 | Binder et al. . |
| 5,084,170 | 1/1992 | Janik et al. . |
| 5,098,559 | 3/1992 | Mack et al. . |
| 5,112,478 | 5/1992 | Mohr . |
| 5,211,846 | 5/1993 | Kott et al. . |
| 5,244,571 | 9/1993 | Church et al. . |
| 5,300,223 | 4/1994 | Wright . |
| 5,312,546 | 5/1994 | Janik . |
| 5,362,390 | 11/1994 | Widenhoefer et al. . |
| 5,362,392 | 11/1994 | Jensen . |
| 5,458,767 | 10/1995 | Stone ........................................ 210/438 |
| 5,770,065 | 6/1998 | Popoff et al. ........................... 210/234 |
| 5,855,780 | 1/1999 | Dye et al. . |

FOREIGN PATENT DOCUMENTS

| | | |
|---|---|---|
| 333469 | 12/1935 | Italy . |
| 46-14715 | 5/1971 | Japan . |
| 47-2087 | 1/1972 | Japan . |
| 47-34410 | 10/1972 | Japan . |
| 48-14230 | 5/1973 | Japan . |
| 52-50364 | 4/1977 | Japan . |
| 53-163780 | 12/1978 | Japan . |
| 54-37966 | 3/1979 | Japan . |
| 61-53564 | 4/1986 | Japan . |
| 63-7285 | 3/1988 | Japan . |
| 5-23506 | 2/1993 | Japan . |
| 1 075 424 | 7/1967 | United Kingdom . |
| 1075424 | 7/1967 | United Kingdom . |
| WO 95/00232 | 1/1995 | WIPO . |

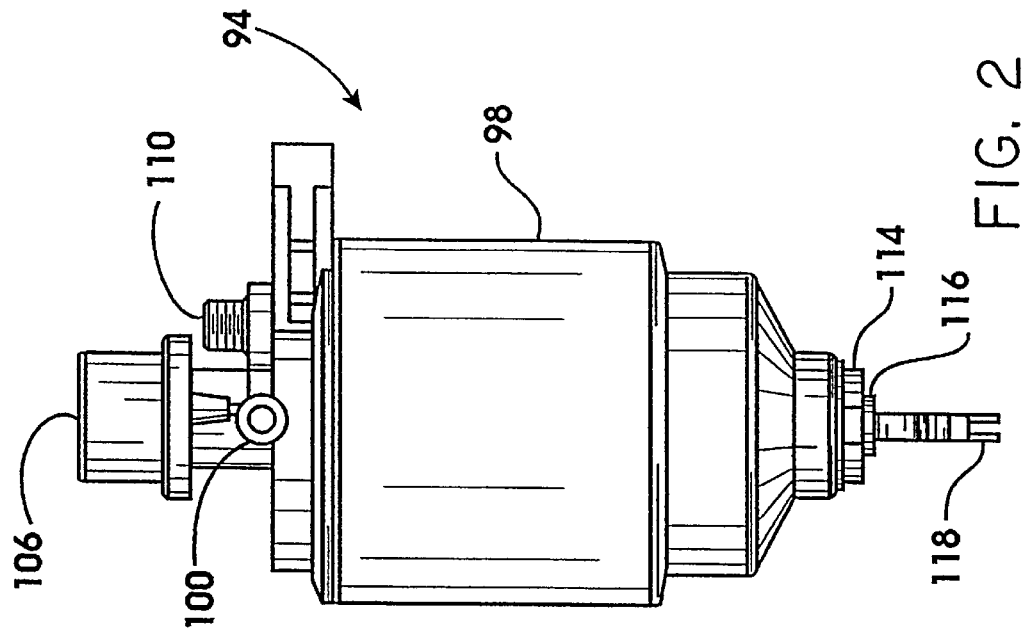
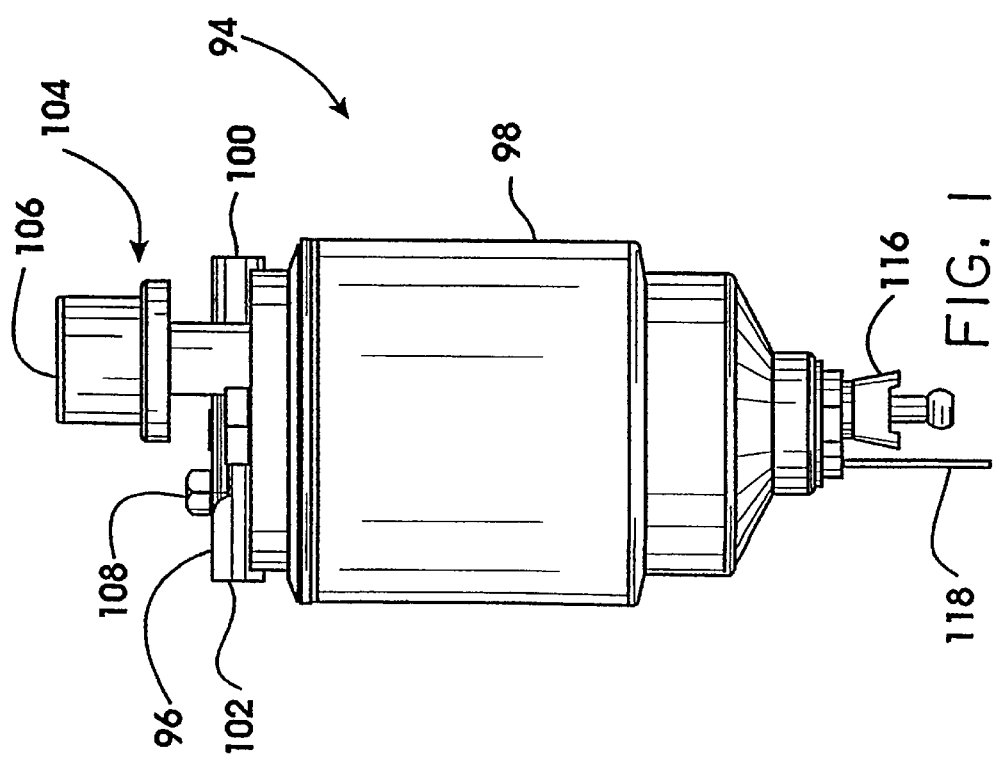

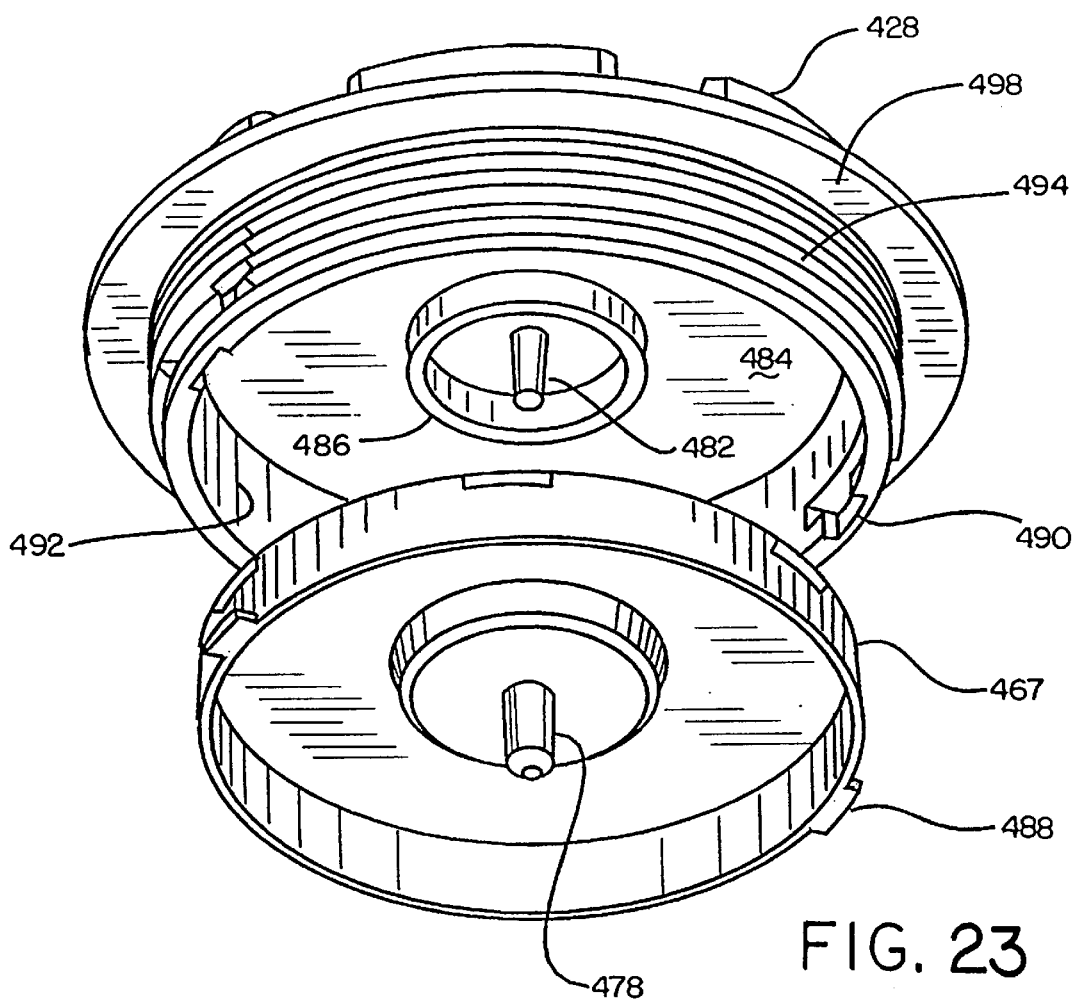
FIG. 23
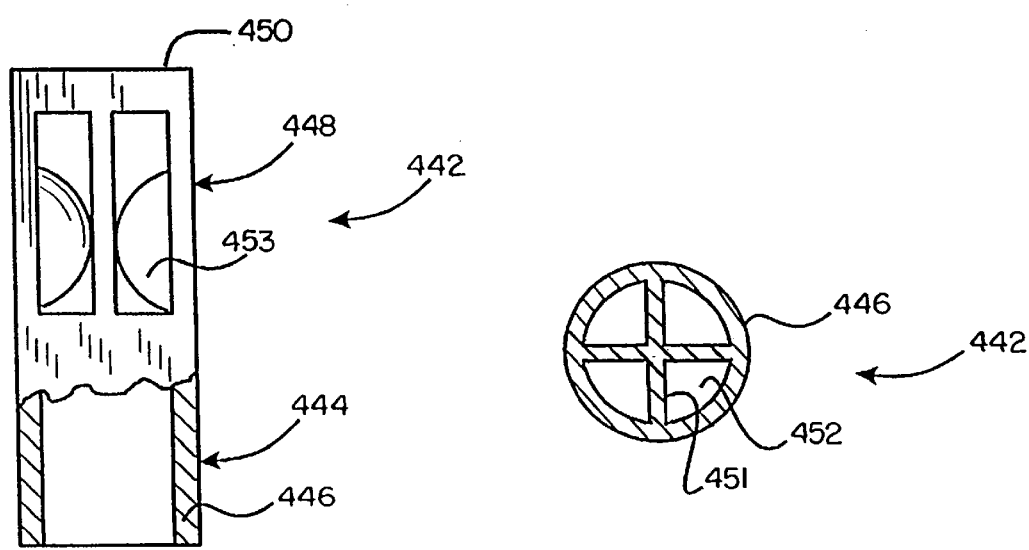
FIG. 24
FIG. 25

FUEL FILTER WITH VALVE DEVICE

RELATED CASES

This application is a continuation-in-part of application Ser. No. 08/150,709, filed Nov. 10, 1993, now U.S. Pat. No. 5,643,446. This is also a continuation-in-part of application Ser. No. 08/731,114 filed Oct. 9, 1996; which is a continuation of application Ser. No. 08/441,584, filed May 15, 1995, now abandoned; which is a continuation of application Ser. No. 08/121,803, filed Sep. 15, 1993, now abandoned, the disclosures of which are incorporated herein by reference.

FIELD OF THE INVENTION

This invention relates to fluid filters, and more particularly to fuel filters and separators for vehicles.

BACKGROUND OF THE INVENTION

Many types of fuel filters and separators are known in the prior art. A popular type of filter and/or separator construction is a type that has a filter head to which a replaceable "spin-on" element is attached. The head is a permanent part of the fuel system of the vehicle and includes inlet and outlet connections to the fuel lines. The element may be readily removed from the filter head and a new one attached without opening the fuel line connections to the filter head.

Another popular type of fuel filter construction is one that has a housing which encloses a replaceable filter element.

Problems may arise such filter elements are replaced. Periodic replacement of the element ensures that the filter element will not become so loaded with impurities that fuel flow is restricted. Replacing the element also ensures that impurities are removed from fuel before it is delivered to other fuel system components such as fuel injection pumps and fuel injectors, where such contaminants may cause severe damage.

One common problem associated with changing filters is fuel spillage. The fuel lines and element are often under pressure. When the element is removed the pressure is relieved and the fuel spills out. This can present a fire hazard as well as a waste clean up problem.

A further problem is that filter elements with different filtration capabilities often have an identical mounting configurations and may fit on the same filter head. However, use of the wrong filter can cause poor engine performance and allow undesirable amounts of contaminants which shortens engine life.

Another problem is that disturbance of the spent element during replacement may cause collected impurities to fall off the element. In some designs, these impurities may travel into the outlet of the filter housing. As a result these contaminants may reach the components downstream in the fuel system.

Another problem is that changing the element may require a mechanic to have skin contact with the fuel. It is desirable to minimize such contact when changing a filter element.

To reduce and at least partially eliminate these problems, the filter element shown in U.S. Pat. No. 4,836,923, owned by the Assignee of the present invention, was developed. This filter assembly includes a replaceable filter element that is attached to a removable cover. This construction enables changing the element while avoiding skin contact with fuel.

A further advantage of this element design is that it has an internal standpipe with an opening at the top. When the element is removed from the housing, the fuel level in the housing falls below the opening to the standpipe. As a result, the impurity-laden fuel left in the housing is less likely to reach the outlet. Likewise, when a new element is installed in the housing, only fuel that has been purified by passing through the media of the element is enabled to reach the opening and pass out of the assembly.

While this element design has many advantages, if the filter element is not removed carefully, impurity-laden fuel in the housing or from the outer surface of the element may fall into the opening in the standpipe. If this happens, some impurities may reach the downstream components of the fuel system.

In addition, the cover is discarded with each spent element. This is undesirable from a conservation and solid waste standpoint. It is generally desirable to minimize the amount of material discarded, particularly if a discarded element must be treated as hazardous waste. The cover also represents a portion of the cost of the replacement element. As a result this design adds cost to the replacement element. Sometimes individuals who do not care about maintaining the vehicle on which the prior art filter assembly is used, may separate the element from the attached cover portion and install the cover on the housing without the element. This causes the vehicle to operate without fuel filtration until the problem is discovered. If the vehicle is operated for an extended period of time in this condition, damage to fuel system components may occur.

In any case, it is believed that there exists a need for a fuel filter that has increased reliability, reduces waste, is low in cost, minimizes skin contact during element changes, minimizes the risk that an improper filter will be used and minimizes fuel spillage.

SUMMARY OF THE PRESENT INVENTION

A new and unique fuel filter is provided in a first preferred embodiment of the invention by a filter head adapted for mounting a replaceable separator or filter element thereon. The element has an in-flow area for accepting incoming fuel, and an out-flow area for delivering fuel that has passed through the element.

The filter head includes an inlet for receiving incoming fuel from the fuel tank or other source of supply. The inlet is in fluid communication with the in-flow area of the element. The head also has an outlet which is in fluid communication with the outflow area of the element through a fluid passage in the head. The outlet of the head is connected to the remainder of the vehicle fuel system including the carburetor or fuel injection system of the engine.

The first embodiment further includes a filter head with a nipple portion which threadably attaches the element to the head. The nipple portion includes a valve element therein. The valve element is positioned in the fuel passage in the nipple portion and is biased by a spring to a closed position.

The filter element has a generally cylindrical housing with an annular ring of filter media therein. The filter media divides a peripheral fuel chamber from a central fuel chamber. In a first form of this embodiment, the filter media is bounded at a first upper end by a first end cap. The first end cap has a first annular end cap wall which extends longitudinally and is disposed radially interiorly of the filter media in the central fuel chamber. The first end cap has a central portion with fluid passages therethrough transversely spanning the annular end cap wall.

In another form of this embodiment, the filter media is bounded at its second lower end by a second end member.

The second end member has a first end cap wall which extends longitudinally and is disposed within the filter media in the central fuel chamber. The second end cap has a central portion which extends transversely across the end cap wall. In this form, the end cap wall can be annular and be spaced radially inward from the filter media, or can have an x-shape (in cross-section) and be closely received within the media.

According to any of these forms, in diametrically-centered relation of the respective end cap wall is an upwardly-extending actuating projection. The actuating projection has a free end within the central fuel chamber, and another end which is fixed to the end cap wall. The free end is aligned with a first opening in a tap plate of the element which accepts the nipple portion therein when the element is attached to said head.

Attachment of the element and the head causes the actuating projection in the nipple portion to engage and move the valve element therein to the open position. This enables fuel to flow out of the filter element. Disengagement of the element causes the valve element to move to the closed position so that air may not readily enter the head or the remainder of the fuel system. Further, the closure of the valve element prevents fuel from flowing out of the head through the nipple portion.

The actuating member is sized and positioned longitudinally so that the actuating member inside the element engages and opens the valve element in the nipple portion when the element is attached to the head. The actuating member may be positioned within various element types at different longitudinal positions each of which corresponds to a particular configuration of a nipple portion. As a result, only the proper element will operate in conjunction with the filter head. This assures proper filtration which provides optimum engine performance and prolongs engine life.

In a second embodiment of the invention, a fuel filter is provided including a housing and a replaceable filter element disposed within the housing. The housing includes a cylindrical internal chamber which has an opening at the top. The housing also has an inlet port and an outlet port. The outlet port is connected to a standpipe which extends vertically upward inside the chamber.

The chamber is adapted for receiving the replaceable element. The element includes a ring of media material for removing impurities from fuel that passes therethrough. The media extends in surrounding relation of the standpipe. The element has a lower end cap which includes a central opening for accepting the standpipe. A seal extends between the surface of the standpipe and the opening in the lower end cap to assure that fuel may only reach an area adjacent to the standpipe by passing through the media.

The element also has an upper end cap. The upper end cap can include latching means for selectively latching the end cap and the element to a cover. The cover is sized for closing the opening at the top of the housing.

The upper end cap also includes a first longitudinally-extending projection that extends into the interior of the element. The projection can be formed in one piece with the end cap or otherwise mounted or fixed thereto. A recess overlies the projection on the end cap. A cover projection that extends from the cover is accepted into the recess on the upper end cap when the cover and the element are latched together.

The standpipe includes a movable flow control element. The flow control element is biased outwardly by a spring toward a position wherein radially extending openings through a side wall of the standpipe are blocked by the flow control element. The flow element is either accessible through an actuator opening in the top of the standpipe, or surrounds the standpipe along a portion thereof.

When the latched element and cover assembly is installed in the housing, the projection of the upper end cap engages and moves the flow element to open the flow openings in the standpipe. As a result, fuel may flow through the fuel filter. If the element is partially removed, the projection enables the flow element to close the openings. As a result, whenever the element is removed, such as during an element change, contaminated fuel cannot pass through the openings. In addition, because the openings in the standpipe extend radially, impurities are less likely to collect in the openings during an element change.

Once the element is removed from the housing, it may be readily unlatched form the cover, and a fresh element latched in position. Skin contact with fuel is minimized. Because the cover is reused, the amount of discarded waste material is reduced.

When the fresh element is installed in the chamber, the end cap and cover engage the flow element so that it is again moved to the open position, so that the filter will operate. The cover projection is sized to prevent flow through the assembly if it is attempted to operate the unit without an element in latched relation with the cover.

Further features and advantages will be apparent upon reviewing the following Detailed Description of the Preferred Embodiment and the appended Drawings.

BRIEF DESCRIPTION OF THE DRAWINGS

FIG. 1 is a front view of a filter head and filter element assembly constructed according to a first embodiment of the present invention.

FIG. 2 is a right side view of the filter head and filter element assembly shown in FIG. 1.

FIG. 23 is an isometric view of the cover of the fuel filter and an upper end cap of the filter element shown in FIG. 22.

FIG. 24 is a partially sectioned side view of the flow control element.

FIG. 25 is a bottom view of the flow control element.

DETAILED DESCRIPTION OF THE PREFERRED EMBODIMENT

Figure 3:
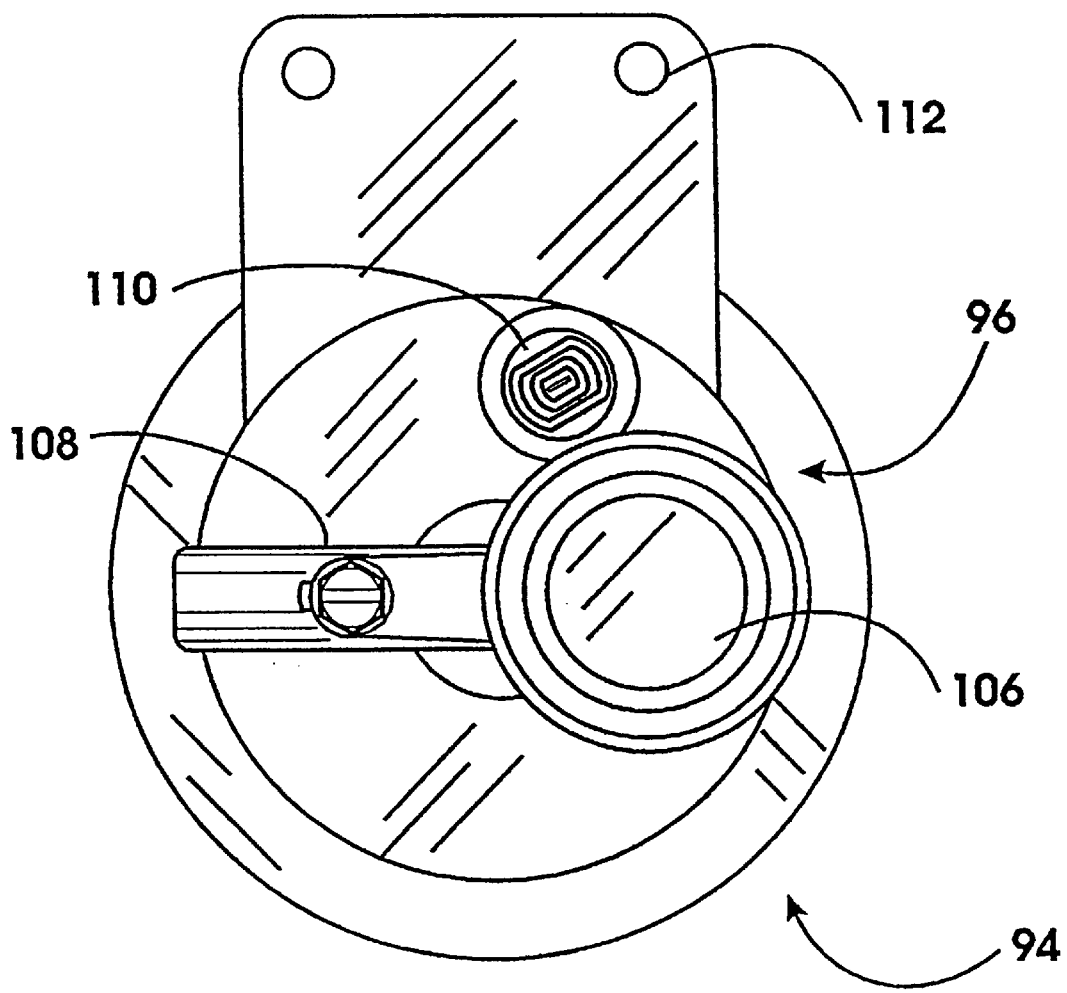
FIG. 3 is a top plan view of the filter head of FIG. 1.

Referring now to the drawings and particularly to FIGS. 1–3, there is shown a first preferred embodiment of the fuel filter assembly of the present invention, which is indicated generally at 94. Filter assembly 94 includes a filter head 96 and a detachable element 98. The head includes an inlet 100 and an outlet 102. The head also includes a pumping portion 104 which includes a movable pump cap 106. The head further includes a vent opening (not shown) which in operation is generally closed by a removable vent plug 108. The vent plug serves the function of enabling air to escape from the element during a priming operation. As will be later discussed, filter assembly 94 is particularly well suited for use in fuel systems in which it is undesirable to allow air to enter the fuel system during a filter element change, to minimize the risk that an improper filter will be used, and to minimize the fuel spillage during element change.

The head 96 also includes an electrical connector 110 for connection to a fuel heater inside the head. The filter head further includes mounting holes 112 to facilitate mounting the filter head on a vehicle.

Element 98 which will be later described in detail is a filter/separator element. It has a removable bottom cap 114, a drain valve 116 and an electrical connector 118 for a water sensor extending from bottom cap 114.

Figure 6:
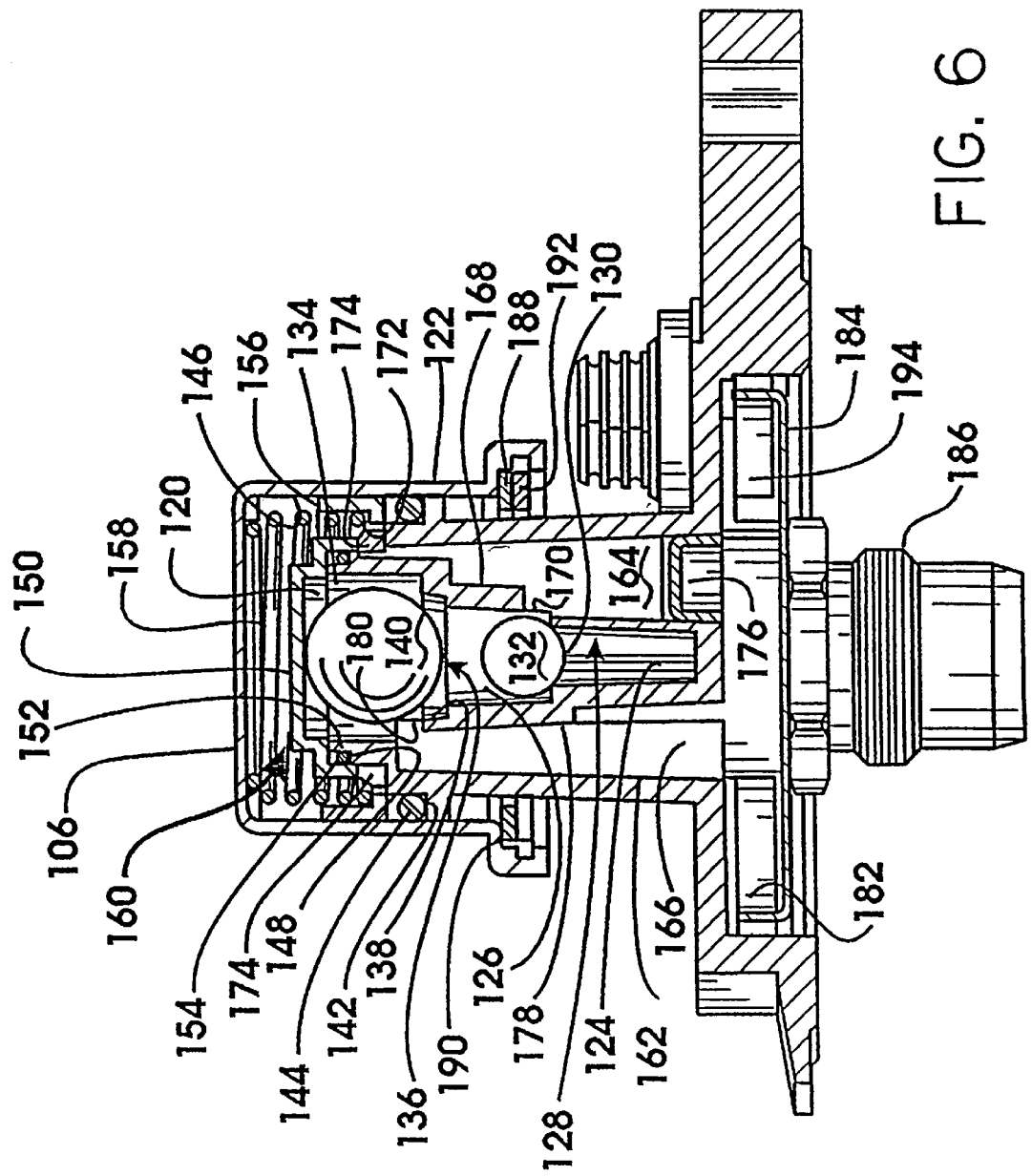
FIG. 6 is a sectional view of the filter head assembly along lines 6—6 in Figure in FIG. 5, with the pump portion of the assembly shown undergoing an output stroke.
Figure 7:
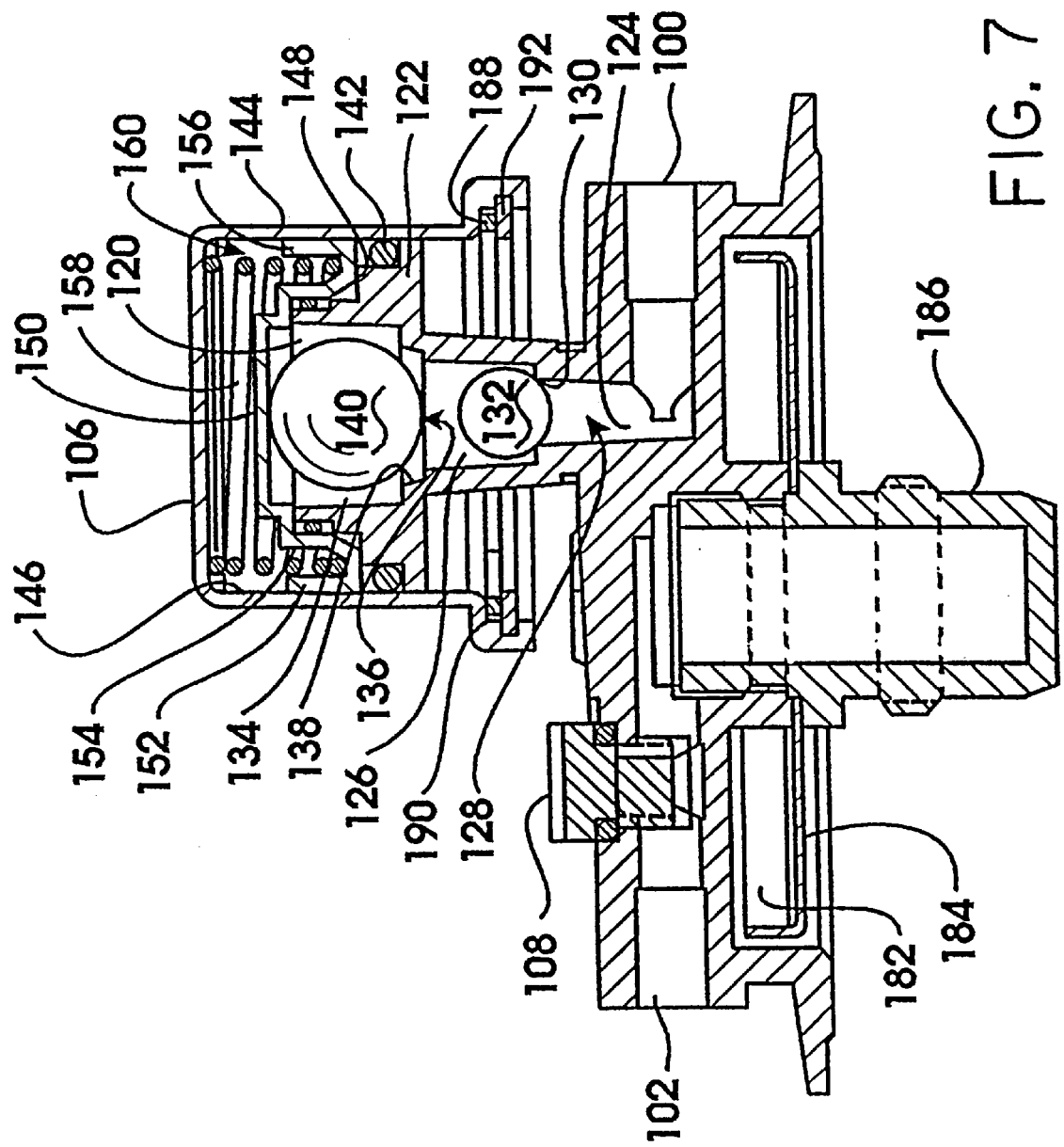
FIG. 7 is a sectional view of the filter head in the output stroke condition of the pump portion along line 7—7 in FIG. 5.

The head 96 and pumping portion 104 are shown in greater detail in FIGS. 4 through 9. As best shown in FIGS. 6 and 7, the pumping portion has an internal upright extending bore 120. The bore 120 is formed integrally with the head and in the operative condition extends upward thereon. The bore is bounded at its outer end by an annular stepped projection 122.

The bore 120 has a first area 124 in fluid communication with inlet 100 (see FIG. 7). The bore 120 also has a second area 126 which is shown disposed vertically above the first area 124. An opening 128 extends between the first and second areas and is bounded by a first seat 130. A first body 132 is movably positioned in the second area above the first seat. Body 132 is sized for acceptance in first seat 132.

Bore 120 further includes a third area 134 shown vertically above the second area 126. A second opening 136 extends between the second and third areas and is bounded by a tapered second seat 138. A second body 140 is movably positioned in the third area and is sized for acceptance in the second seat 138. First and second bodes 132, 140 are preferably comprised of rubber material that has a greater density than the fuel passing through the head so that it will not tend to float therein.

Stepped annular projection 122 has a first step 142 which supports an annular resilient first seal 144. Seal 144 engages a cylindrical inner cap well 146 of pump cap 106 in fluid-tight relation.

Annular projection 122 further includes a second annular step 148 thereon. Second annular step 148 supports a closure disk member 150 thereon. Closure disk member 150 serves to close the open top end of bore 120. Steeped projection 122 further includes a third annular step 152 which supports a second seal 154 thereon. Seal 154 prevents fluid from escaping from the bore underneath the closure disk member.

The closure disk member 150 further includes an outer annular flange portion 156 which engages inner wall 146 of the pump cap 106 in slideable abutting relation. The flange portion 156 further serves as a centering nest for a compression spring 158 which extends between the disk-shaped member 150 and the inside top surface of pump cap 106.

The seal 144 supported by the stepped projection 122 bounds a variable volume area generally indicated 160 in the interior of pump cap 106. When pump cap 106 is moved longitudinally downward, the volume of the pump cap above the stepped projection decreases and pressure rises in area 160. Returning movement in the upward direction of the pump cap creates a vacuum in area 160.

Figure 4:
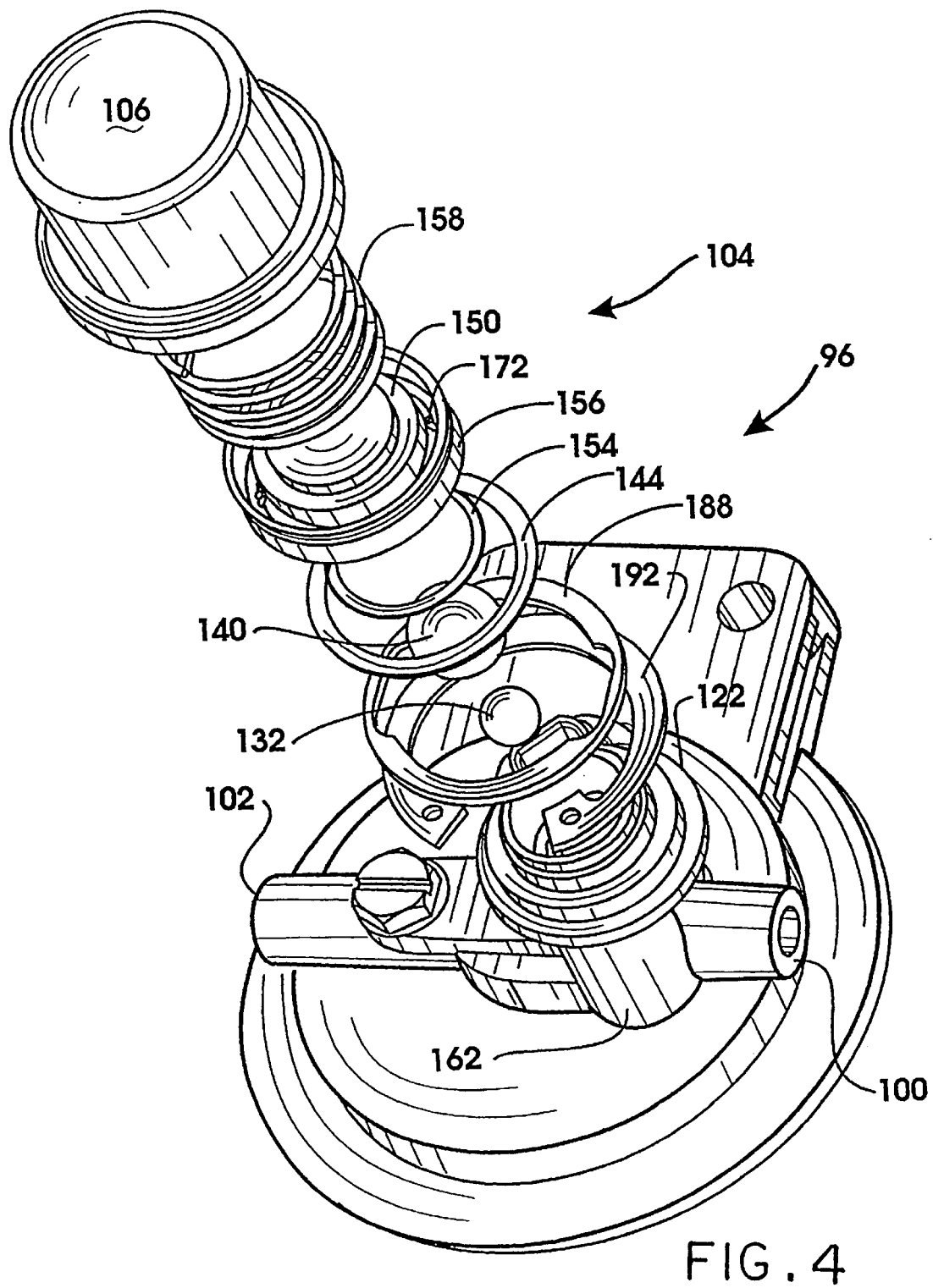
FIG. 4 is an isometric exploded view of the filter head assembly shown in FIG. 1.
Figure 5:
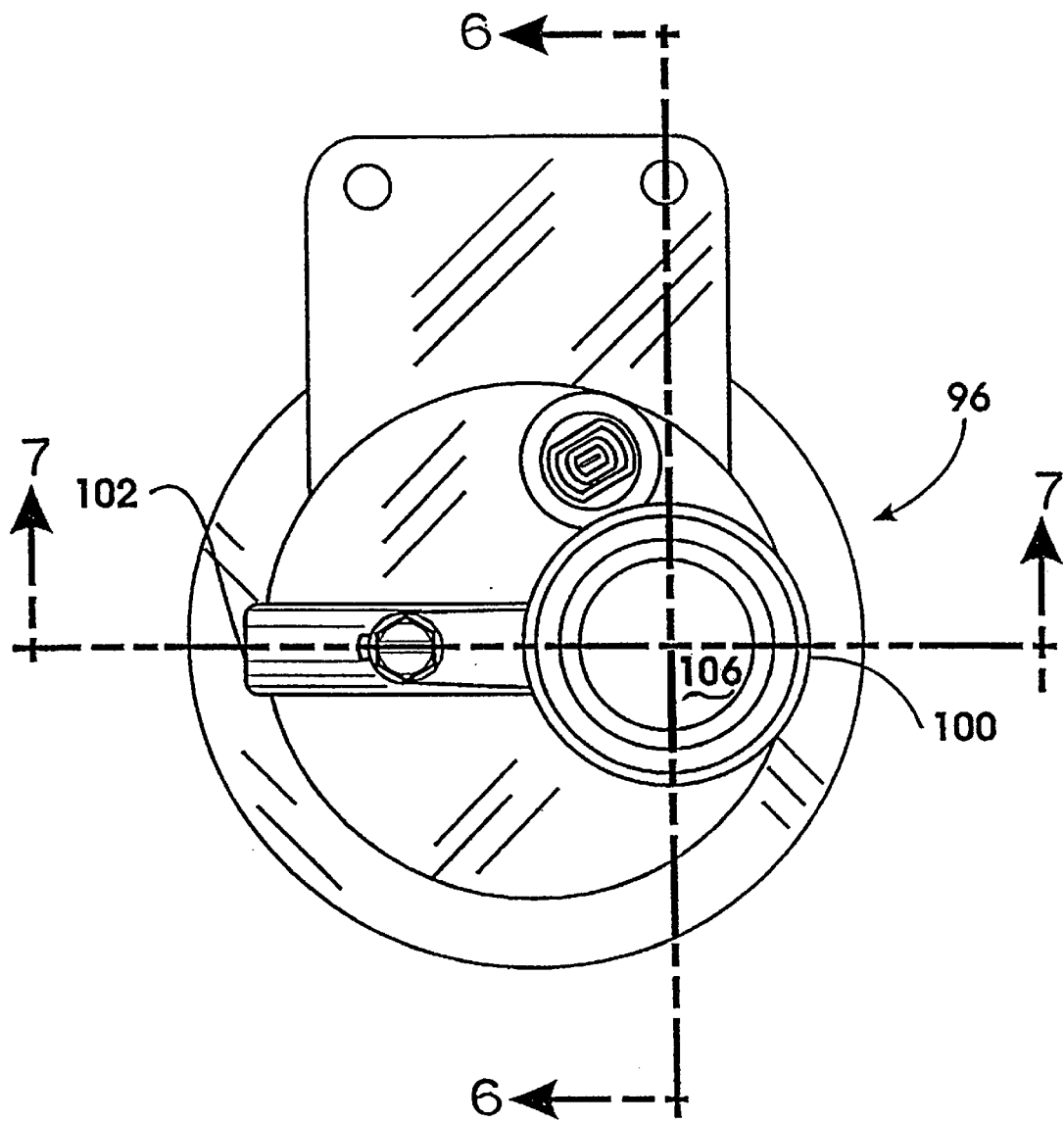
FIG. 5 is an enlarged top plan view of the filter head assembly shown in FIG. 3.

A split sleeve 162 extends in surrounding relation of bore 120 at the sides thereof (see FIGS. 4 and 6). The sleeve bounds a first chamber 164 on a first longitudinal side of the bore 120. On an opposed side, the sleeve 162 bounds a second chamber 166. The bore is bounded in the first chamber 164 by a wall 168. Wall 168 has an opening 170 therethrough longitudinally above first seat 130. As a result, second area 126 of the bore is in fluid communication with first chamber 164.

First chamber 164 is also fluidly open through a cutout 172 adjacent annular second step 148 of stepped projection 122. The cutout 172 is open to variable volume area 160 through a pair of opposed openings 174 in the inside lower surface of closure disk member 150.

First chamber 164 is closed at its lower end by a knockout plug 176. The opening closed by the knockout plug is used during manufacture to facilitate forming the chamber.

First chamber 164 is in fluid-tight communication with the variable volume area 160 outside the pump cap 106.

Further, first chamber 164 is in fluid communication with the second area 126 of the bore.

Second chamber 166, on the opposed side of the bore from first chamber 164, extends between the inside of the sleeve wall 162 and a wall 178 which bounds the bore 120. Second chamber 166 is open to the third area 134 of the bore through a cutout 180 above second seat 138.

Second chamber 166 is open at the bottom thereof into an annularly-extending heater chamber 182. Heater chamber 182 is bounded by a dish-shaped member 184 which has PTC type heating elements mounted thereto. The dish-shaped member 184 is supported on a nipple portion 186 which is threadably engaged with the head and is also threadably engageable with the element 98 as later discussed in detail.

Figure 14:
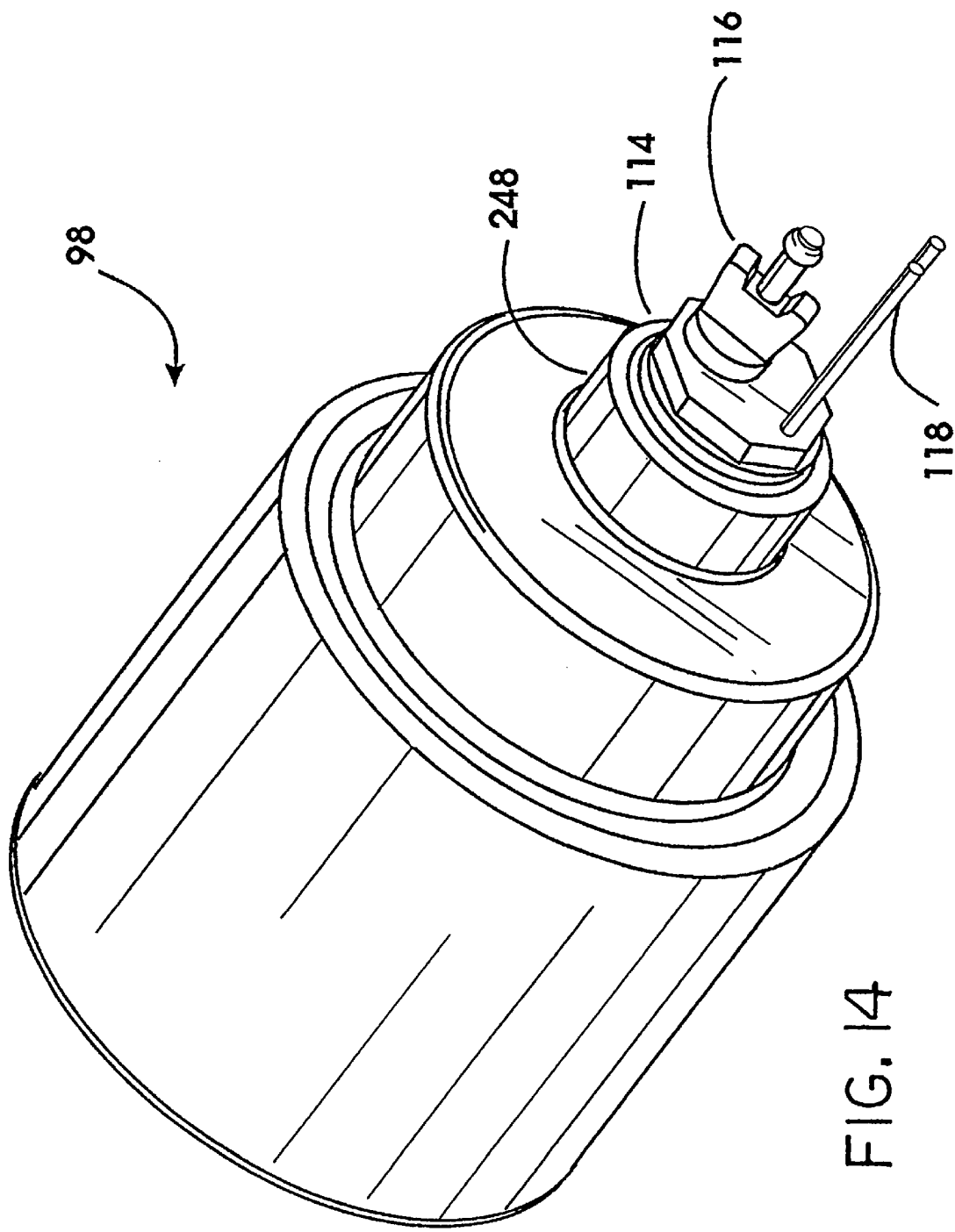
FIG. 14 is an enlarged isometric view of a second end of the filter element shown in FIG. 13.
Figure 15:
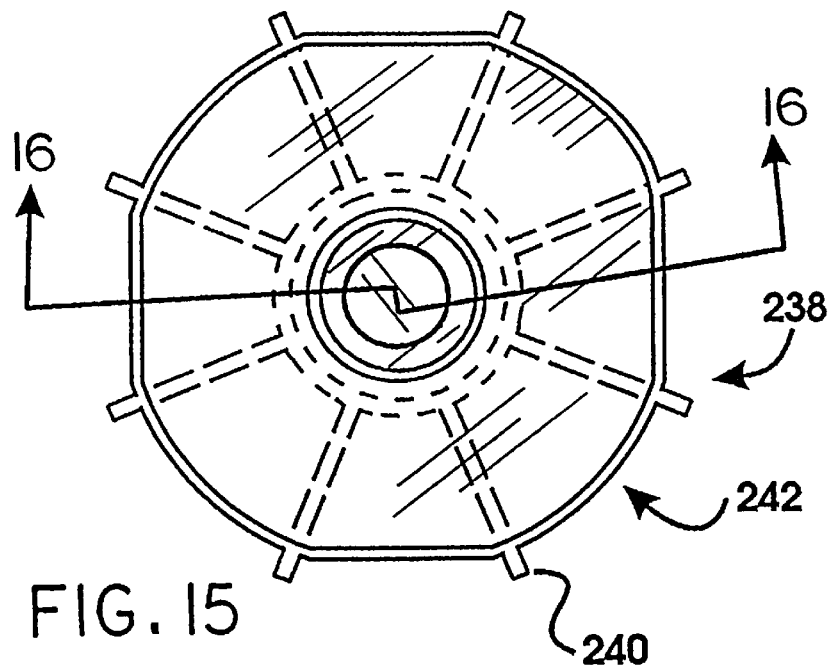
FIG. 15 is a top view of the second end cap of the filter element shown in FIG. 11.

The pump cap 106 is made of relatively rigid plastic material. It is held to the head by a support ring 188 which engages an outward-extending annular flange 190 inside the cap. The support ring is held against flange 190 by a snap ring 192 which nests in an annular recess in the cap. The support ring is adapted to engage the lower face of projection 122 when the pump cap is in its upward position (see FIGS. 14 and 15). The engagement of the support ring with the lower face of projection 122 prevents the pump cap from disengaging from the head.

The operation of the priming pump will now be briefly described. Pumping action is initiated by alternately depressing and releasing pump cap 106. When cap 106 is depressed, as shown in FIGS. 6 and 7, the pressure generated inside the cap by the decrease in volume of the variable volume area 160 is transmitted to the first chamber 164 through the openings 174 in the closure disk member 150 and the cutout 172 at the top of first chamber 164. This increased pressure is transmitted to the second area 126 inside bore 120 through opening 170. Because the diameter of the bore in the second area is greater than the diameter of body 132, the pressure passes upwardly around the body 132 which remains seated blocking fluid flow in first area 124.

The increase in pressure in the second area pushes second body 140 upward off the second seat 138. As a result, any fluid in the second area is pushed upward through the third area 134 and out through cutout 180 into second chamber 166. In chamber 166 the fuel flows downward into heater chamber 182. In the heater chamber the fuel may be heated if the heater is operating. However, regardless of whether the fuel is heated, the fuel flows through the heating chamber upward over the lip of the dish-shaped member 184 and through opening 194. As will be later explained, once the fuel has passed out of the heater it flows to a peripheral chamber of the filter element.

It should be noted that in its upward position, body 140 engages the inside of closure disk member 150. This insures that the body does not move to a position wherein it will not readily fall back into its seated position when the pressure is dissipated.

Figure 8:
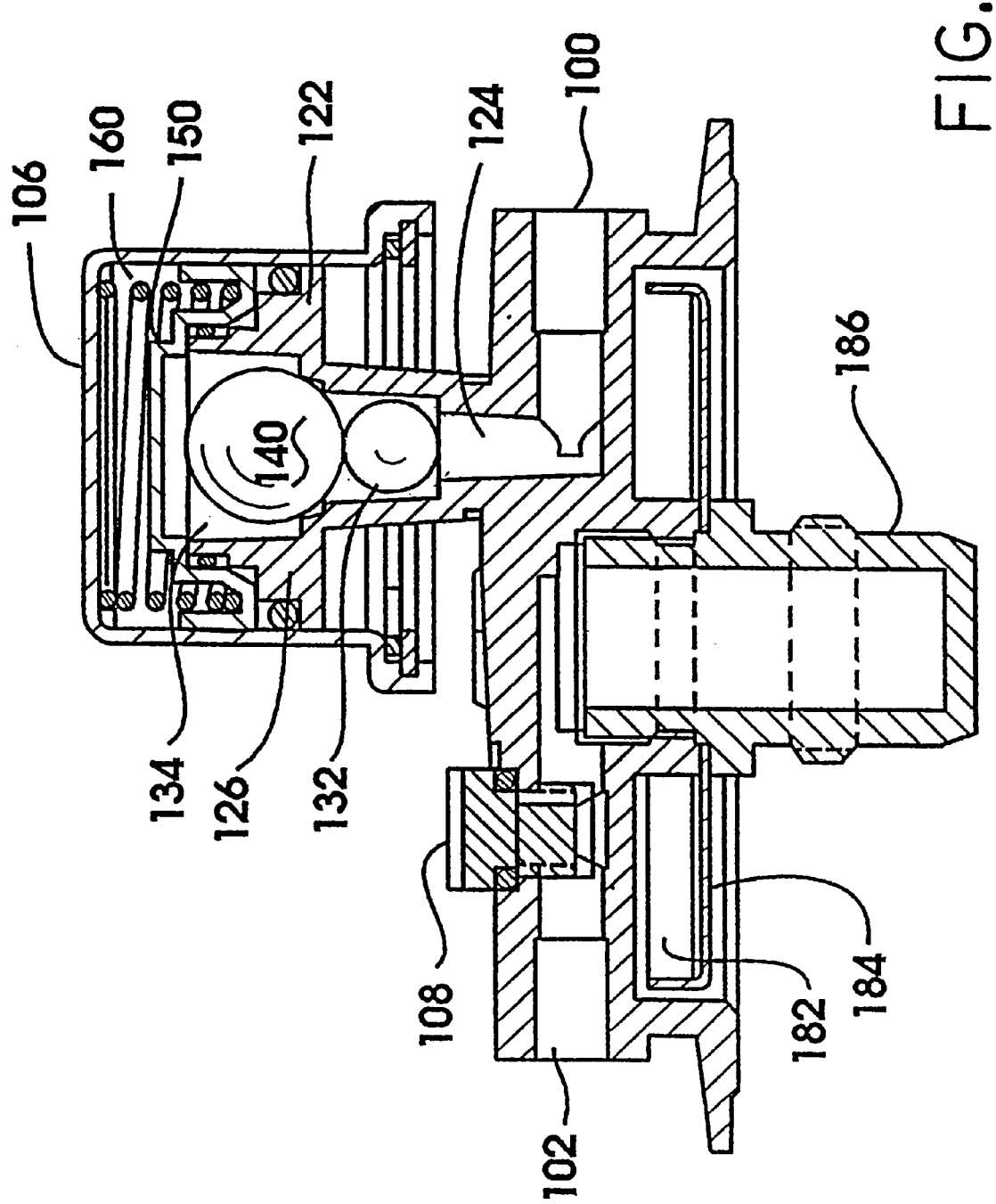
FIG. 8 is a sectional view similar to FIG. 6 except that the pump portion is shown undergoing an intake stroke.
Figure 9:
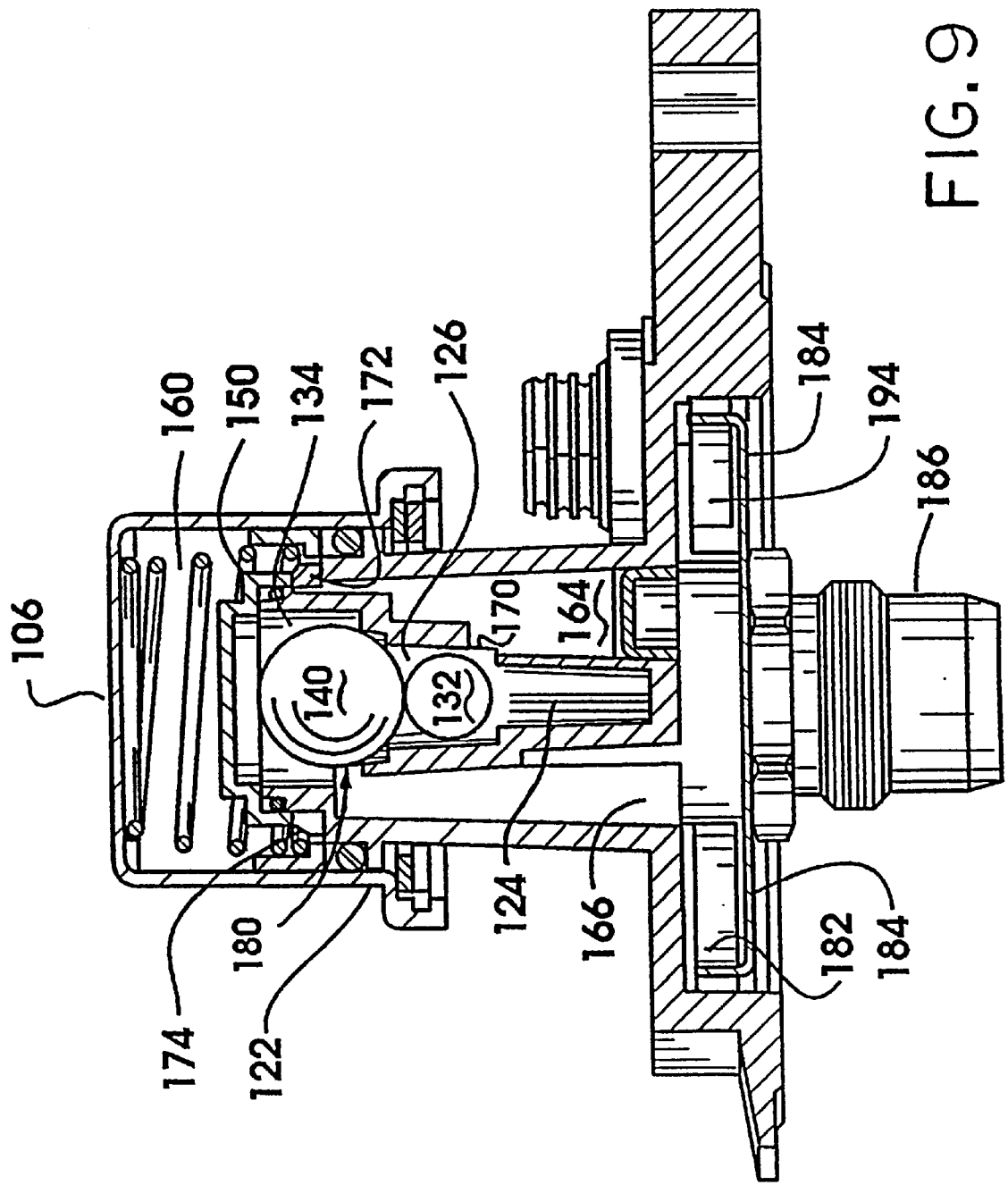
FIG. 9 is a sectional view similar to FIG. 7 except the pump portion is shown undergoing an intake stroke.

When pump cap 106 is released from its lower position, it is moved upward by the force of spring 158 to the position shown in FIGS. 8 and 9. This upward movement increases the volume of chamber 160 inside the cap and creates a vacuum. The vacuum is transmitted to first chamber 164 through cutout 172 and the opening 174 in the closure disk member 150. The vacuum is transmitted to the second area 126 at the bore 120 through opening 170. The vacuum moves body 132 upward off its seat. In this condition the body 140 remains seated due to the vacuum force on its lower side. Upward movement of body 132 is restricted by its engagement with body 140. This insures that body 132 will return to its seat when the vacuum is dissipated.

The vacuum applied to the second area 126 pulls fuel into the second area from the first area 124 and the inlet 100. When the vacuum is dissipated the pump is again depressed to repeat the cycle.

In some systems, when there has been an element change the vent plug 108 is removed and the priming pump cycled until the new element is filled with fuel and all air in the new element has been displaced and pushed out the vent opening. Thereafter the vent plug is reinstalled. This minimizes the amount of air that may enter the system and avoids possible problems with restarting the engine after a filter change.

When the filter is primed the engine may be started. If the fuel is drawn through the element and filter head by vacuum, the incoming fuel will pass into the inlet 100 of the head and upward through the areas of bore 120. In this condition both bodies 132, 140 are disposed upward from their respective seats to enable fuel flow through the bore. This enables fuel to flow in the annular clearances between the bodies and the walls of the bore. The bodies are sized such that they provide a relatively large flow area between the periphery of the bodies and the bore so that restriction to flow is minimized.

It is preferred that the bodies are sized so that body 140 abuts the closure disk member 150 and body 132 abuts body 140. As a result, in the running condition the bodies are positioned to prevent significant restriction to flow. Of course, in other embodiments of the invention, bodies of different shapes and sizes may be used.

The spherical character of bodies 132 and 140 also makes them inherently self-cleaning. This avoids the collection of impurities on the bodies which could impair their function as part of check valve means. The filter head of the present invention is also constructed so that it functions equally well in systems where the head is positioned on the downstream side of a fuel pump and fuel is pushed into the inlet by pressure rather than drawn through by vacuum.

Figure 10:
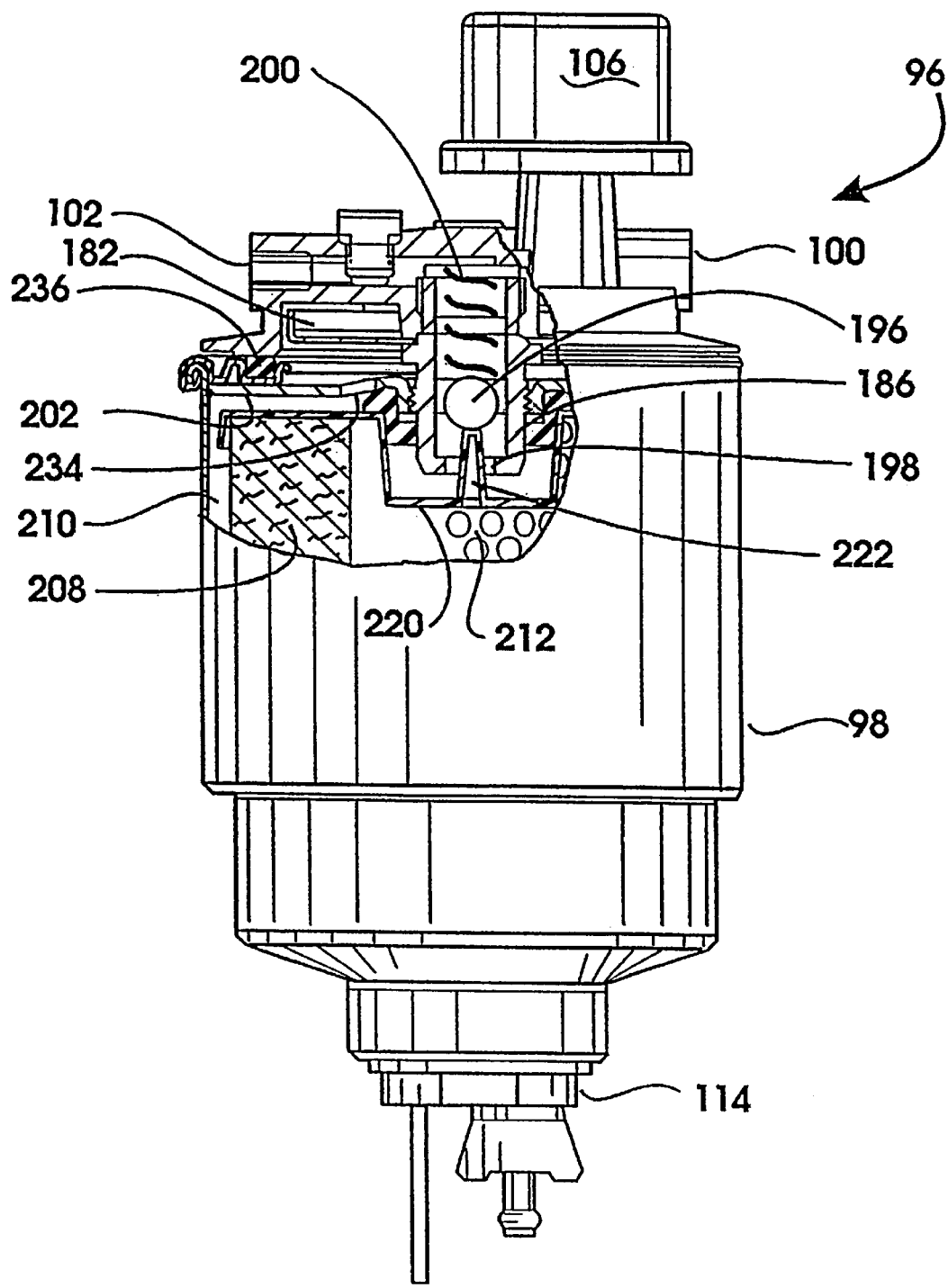
FIG. 10 is a partial cutaway view of the filter head and element assembly of FIG. 1.
Figure 11:
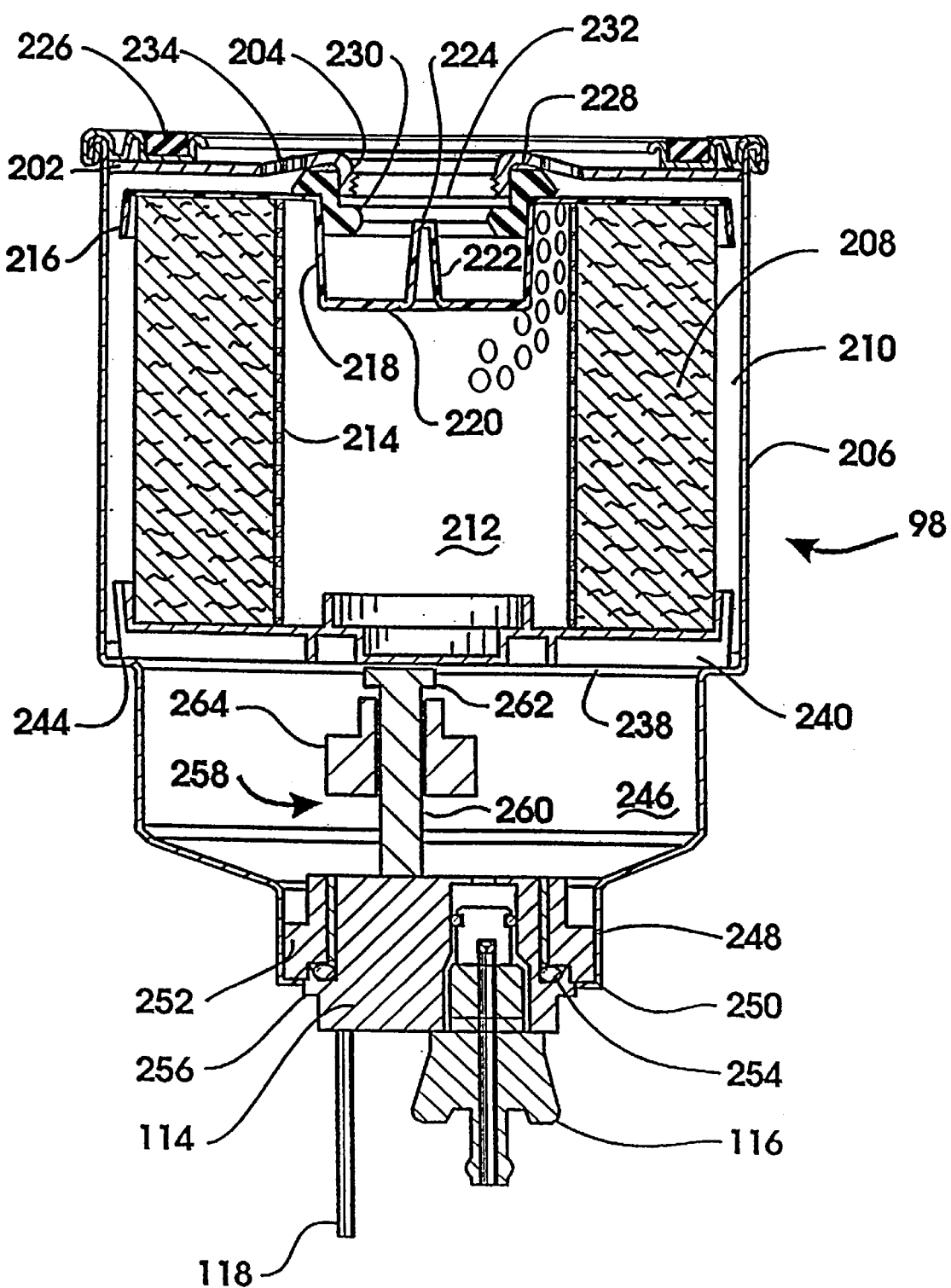
FIG. 11 is a cross-sectional view of the filter element of FIG. 10.
Figure 12:
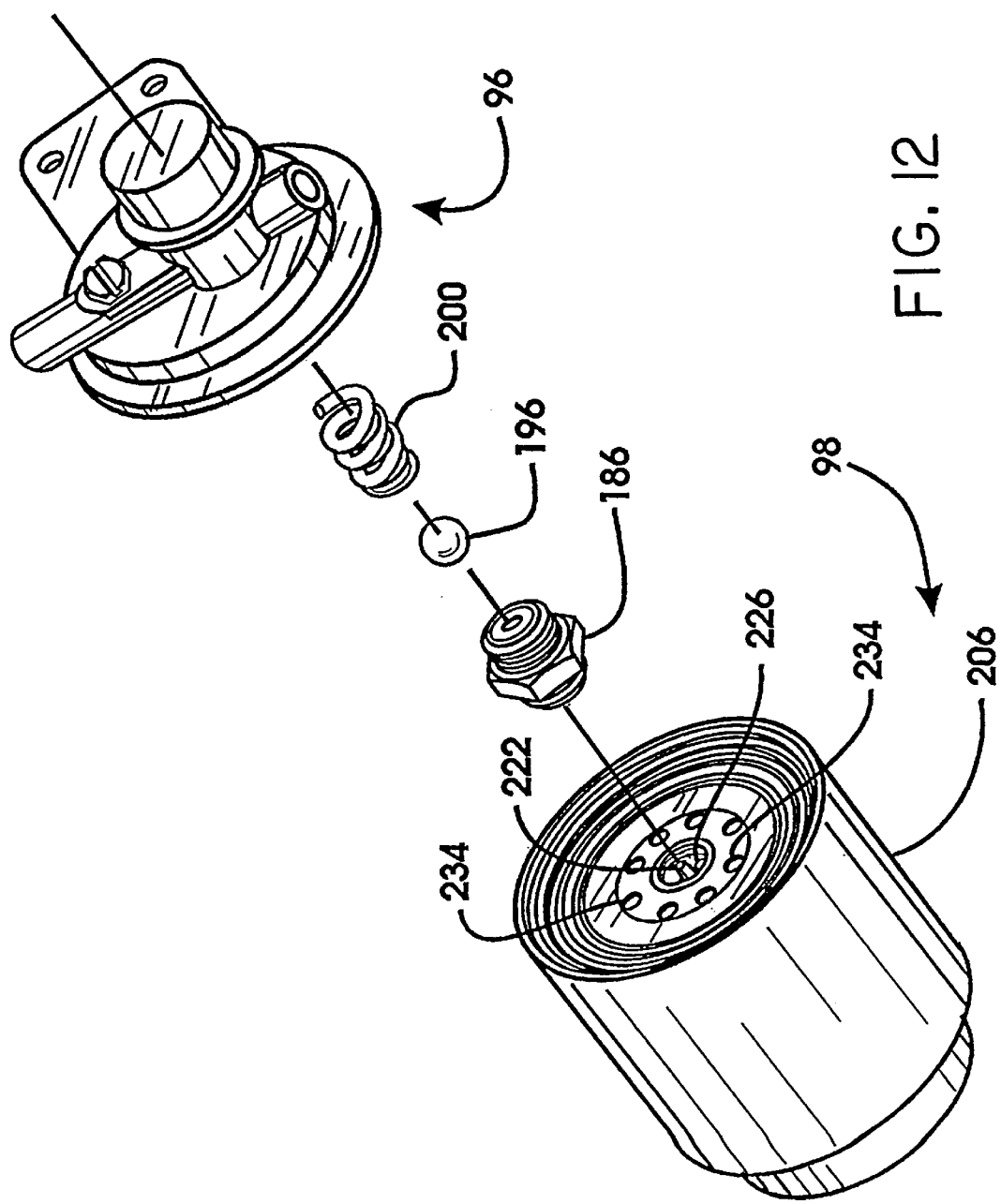
FIG. 12 is an isometric exploded view of the head, nipple portion, valve element, and filter element shown in FIG. 10.

The filter element 98 and the head 96 are shown in greater detail in FIGS. 10 through 12. The nipple portion 186 includes a valve element 196 that is movable therein. The valve element is adapted for blocking an opening 198 at the lower end of the nipple portion. A spring 200 biases the valve element 196 towards the closed position in which it shuts off flow through the nipple portion.

The filter element 98 includes a tap plate 202 at a first end thereof. The tap plate has a central threaded opening 204 which threadably engages an enlarged threaded area of nipple portion 186. As shown in FIG. 11, the element includes an outer generally cylindrical housing 206. The housing encloses an annular ring of filter media 208. The media 208 removes impurities from fuel passing therethrough. The media separates a peripheral fuel chamber 210 from a central fuel chamber 212 inside the media. The inner face of the media is supported by a perforated center tube 214.

Media 208 is attached at a first longitudinal end surface to the inside surface of a first end cap 216. The media is attached to the first end cap by potting compound or similar adhesive material. The first end cap includes a longitudinally-extending annular wall 218 in the central fuel chamber. Annular wall 218 is radially disposed inwardly from the center tube 214 of the media 208.

Figure 13:
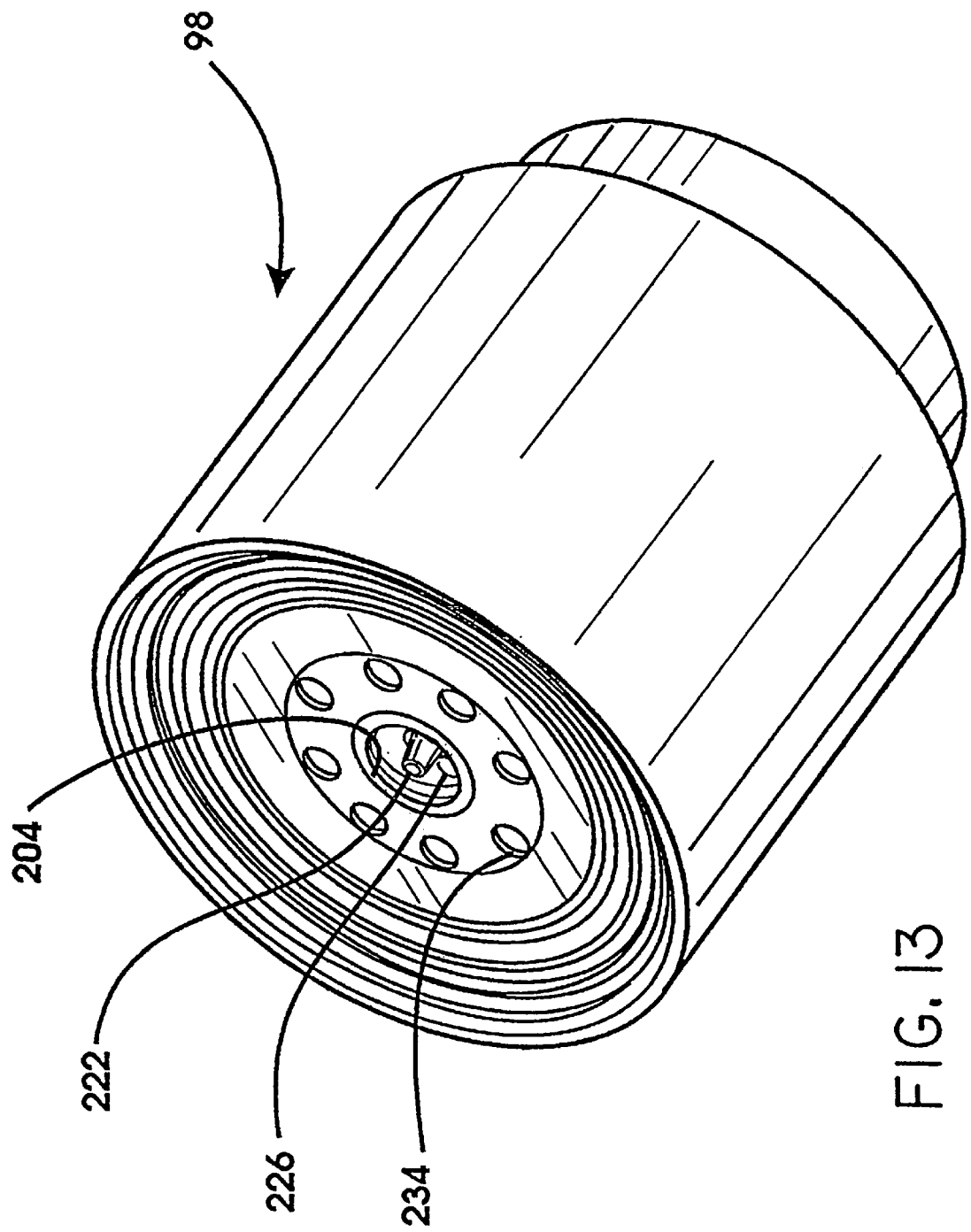
FIG. 13 is an enlarged isometric view of a first end of the filter element shown in FIG. 12.

A central disk-shaped portion 220 spans the longitudinal wall 218 of the first end cap. An actuating projection 222 extends longitudinally outward from the central portion 220. The actuating projection 222 has a free end 224 which is positioned longitudinally inward from the tap plate 202. The central portion 220 includes a plurality of fluid passages 226 therethrough (see FIGS. 12 and 13). The fluid passages 226 enable fluid to pass through the first end cap in the recessed area bounded by wall 218. Alternatively, or in addition to fluid passage 226, projection 222 could include one or more fluid passages (e.g., at the tip or along the side surfaces of the projection).

A resilient seal 228 is positioned intermediate of the inside of tap plate 202 and first end cap 216. Seal 228 surrounds opening 204 in the tap plate and extends inwardly so as to annularly engage the radially-extending surface and longitudinal wall 218 of first end cap 216. Seal 228 further includes a radially-inward projection 230 which extends inward from a radially-extending annular outer face of the seal. The seal 228 is held in compressed relation between the first end cap 216 and the tap plate 202 and further serves to segregate the fuel in the peripheral fuel chamber 210 from the fuel in the central fuel chamber 212.

The tap plate 202 includes a plurality of angularly-spaced second tap plate openings 234. The second tap plate openings 234 are disposed radially outward from seal 228 and are in communication with peripheral fuel chamber 210 of the element. A resilient annular seal 236 extends radially-outward beyond openings 238 on the exterior of the element.

As shown in FIG. 10, when the element 98 is engaged to the head 96, the threaded enlarged area of nipple portion 186 engages the threaded opening 204 in the tap plate to securely hold the element to the head. When the element is engaged to the head, the inward projection 230 of seal 228 engages the interiorly extending area of nipple portion 186 to provide a leak resistant connection with the central fuel chamber. Further, the free end 224 of actuating projection 222 is positioned to engage valve element 196 and move it away from opening 198 to enable fluid to flow through opening 198 from the central fuel chamber 212 of the element. This enables the central fuel chamber of the element to be in connection with the out 102 of the head.

With element 98 attached to the head by engagement between the nipple portion and the tap plate, seal 236 engages the head circumferentially outward of the second tap plate openings 234 in fluid-tight relation. This provides a fluid-tight region between the nipple portion and seal 236. Fuel that passes out of the head through the openings 194 in the heater chamber 182, flows into this region and passes through the second tap plate openings 234. As a result, fuel from the head flows into the peripheral fuel chamber 210 between the media 208 and the housing of the element. Fuel is thereby required to pass in outside/in fashion through the media 208 and be filtered before it reaches the outlet 102.

The actuating projection 222 and valve element 196 function to close off any flow through the nipple portion when the element is removed. As a result, fuel spillage is minimized. Further, this feature minimizes the amount of air that gets into the system. This is particularly useful if the fuel filter is mounted in a vertically low position in the system. In such cases, a large quantity of fuel could otherwise drain out. This could cause the fuel lines to become air bound and cause great difficult in starting the engine and/or require excessive priming before the engine will start.

A further advantage of the construction shown is that the actuating projection 222, the nipple portion 186 and valve element 196 must have a precise mating relationship to enable the filter element to be engaged with the head and two work properly in conjunction therewith. This is important when the tap plate configuration is similar for different types of fuel filter/separator elements, many of which would not be suitable for the particular application. By varying the longitudinal position of the actuating member and the length of the nipple portion extending into the central fuel chamber of the element so that each corresponds only for the proper filter type, it may be assured that only the correct filter element is installed on the head. This is achieved because if the nipple portion is for example, "too long" for the filter element, the inner face of the nipple portion will bottom out against the central portion 220 inside the element before the threads on the nipple portion and the tap plate engage. Similarly, if the nipple portion is "too short" the actuating projection will not engage the valve element. As a result, the valve element will stay closed and it will not be possible to prime the element or start the engine. Therefore, regardless of what type of error is made, an improper element will not work in conjunction with the filter head.

Figure 16:
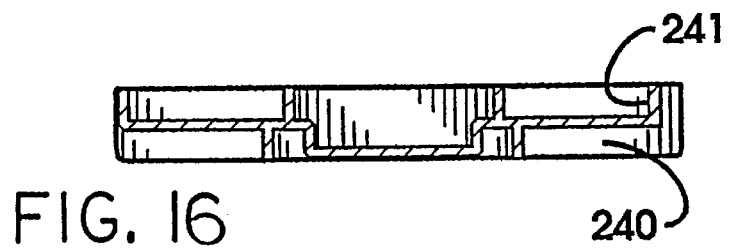
FIG. 16 is a sectional view of the second end cap along line 16—16 in FIG. 15.
Figure 17:
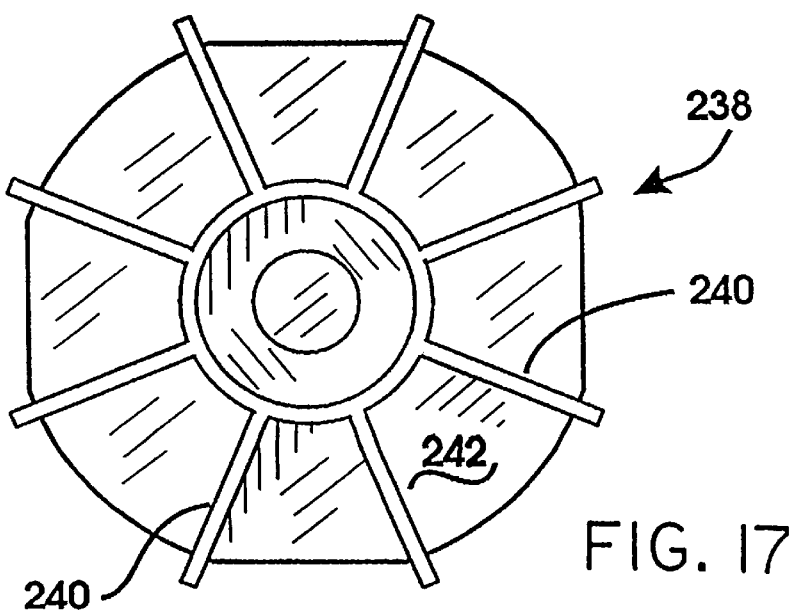
FIG. 17 is a bottom view of the second end cap shown in FIG. 11.

Referring again to the cross-sectional view of the element shown in FIG. 11, the media 208 is bounded at a second longitudinal flat end surface by a second end cap 238 which is a disk-shaped member. The second end cap 238 is shown in detail in FIGS. 15 through 17. The second end cap includes a plurality of radially-extending projections 240 that extend outward from the end cap to the peripheral fuel chamber 210. The projections 240 have annular spaces 242 therebetween. The second end cap 238 also includes a flat inside surface and an upturned annular projection 241 for bounding the exterior of the media.

The housing 206 includes an annularly in-turned portion 244. The in-turned portion 244 supports the projections 240 of second end cap 238. Contaminants which collect on the surface of the media in the peripheral fuel chamber are enabled to fall downward in the housing and pass through the spaces 242 between the projections 240. Such contaminants collect in a contaminant collection area 246 in a lower portion of the housing.

The projections 240 also extend radially outward from the media and serve to maintain the media in spaced relation away from the inside wall of the housing. This along with annular projection 241 prevents the media from becoming dislodged even in a severe vibration environment such as when attached to an engine. Further, the supported relation of the projections on the in-turned portion of the housing enable seal 228 to be compressed between the first end cap and the tap plate. The compression of the seal provides a longitudinal force that not only maintains fluid separation between the central fuel chamber and the peripheral fuel chamber but also helps to avoid separation of the media from its end caps inside the housing.

The contaminant collection chamber 246 inside the housing is bounded at its lower end by a tapered annular portion. The housing further includes at its lower end a longitudinally-extending wall portion 248. Wall portion 248 terminates in an annular in-turned lip 250. Lip 250 supports an internally threaded ring-shaped member 252 which threadably accepts threads on bottom cap 114 therein. A seal 254 extends between the bottom cap and the ring member 252. In addition, an annular outward extending shoulder 256 of the cap engages the in-turned lip 250 to insure a fluid-tight fit when the cap is mounted to the housing.

The drain valve 116 and electrical connector 118 extend from the bottom of cap 114. The contaminant collection area 246 has a water sensor generally indicated 258 therein. The water sensor includes a longitudinally-extending post 260 which extends from cap 114. The post has an enlarged head 262 which is adapted to be in closely disposed relation from the lower end cap 238. The closely spaced post and end cap further provide an opportunity for central support of the lower end cap should it undergo deformation due to excessive pressure or deformation of the outer housing.

A floatable member 264 is slidably movable longitudinally on post 260. Floatable member 264 is buoyant in contaminants such as water so that when the level of contaminants in area 246 rises floatable member 264 will rise as well. An inductance sensor in post 260 is used to provide an electrical signal indicative of the position of floatable member 264. The electrical signal is used to indicate that the contaminant collection area is filled with contaminants. Typically this electrical signal is transmitted via connection 118 to an appropriate warning device such as a light.

Figure 18:
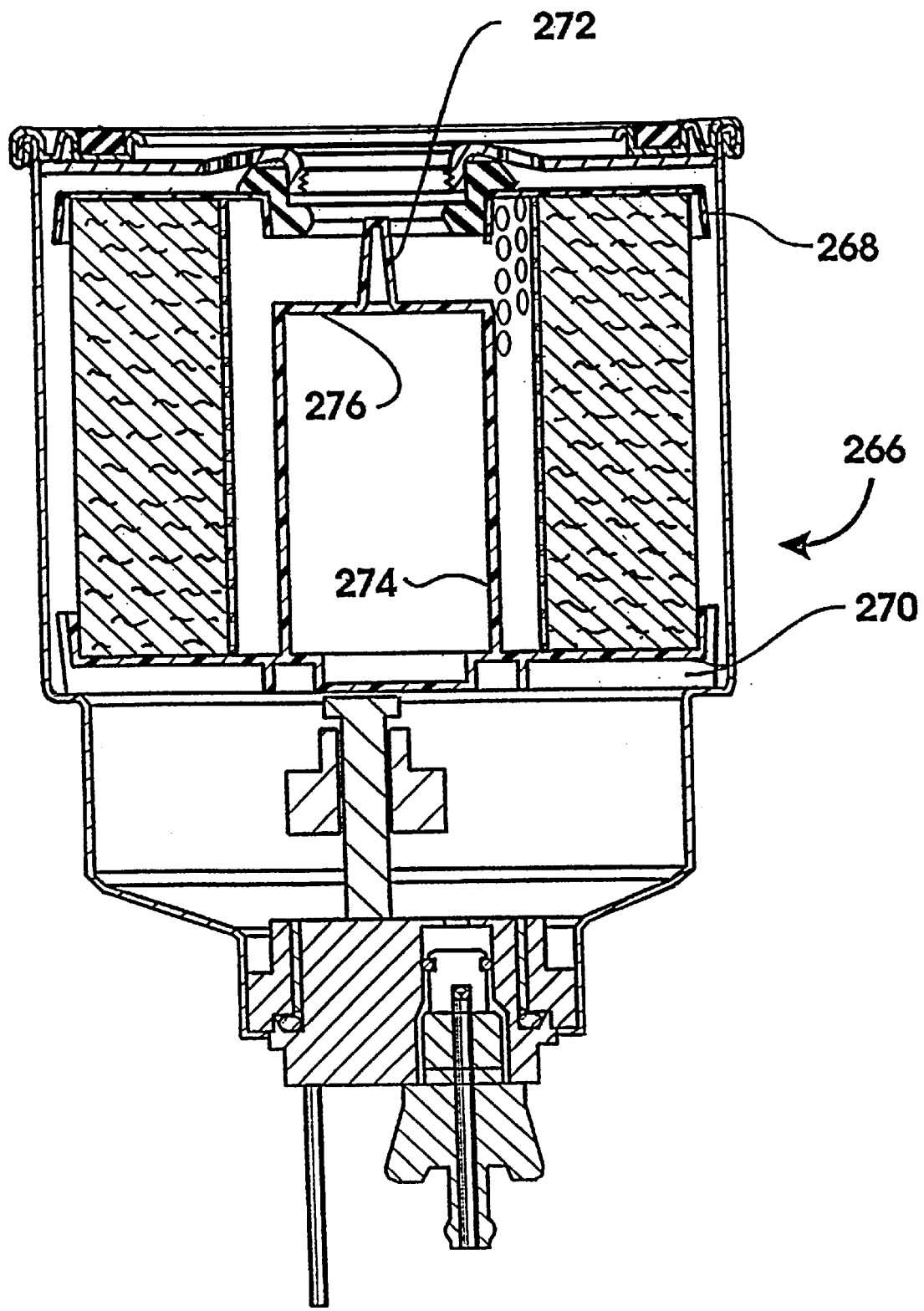
FIG. 18 is a further form of the filter element constructed according to the first embodiment of the present invention.

An alternative form of a filter 266 suitable for use with a filter head similar to head 96 is shown in FIG. 18. Element 266 is similar to element 98 in all aspects except that it has a first end cap 268 which does not include an actuating projection. Rather, element 266 has a second end cap 270 which includes an actuating projection 272 thereon. The second end cap also has a longitudinally-extending annular wall 274 which is radially inwardly disposed from the filter media. A central portion 276 of the second end cap spans the annular wall and includes the actuating projection thereon. Unlike the prior embodiment, central portion 276 does not include fluid passages therethrough. The first end cap of element 266 includes an annular opening and supports the resilient seal between the first end cap and the tap plate.

The element 266 may be made with annular internal walls of various longitudinal lengths tailored to the length of the nipple portions in various filter heads. By varying the length of wall 274 of the second end cap 270, the invention ensures that only the proper filter element will work with the head in the fuel system. Further, the embodiment element 266 provides all of the other advantages associated with element 98 which were previously described.

Figure 19:
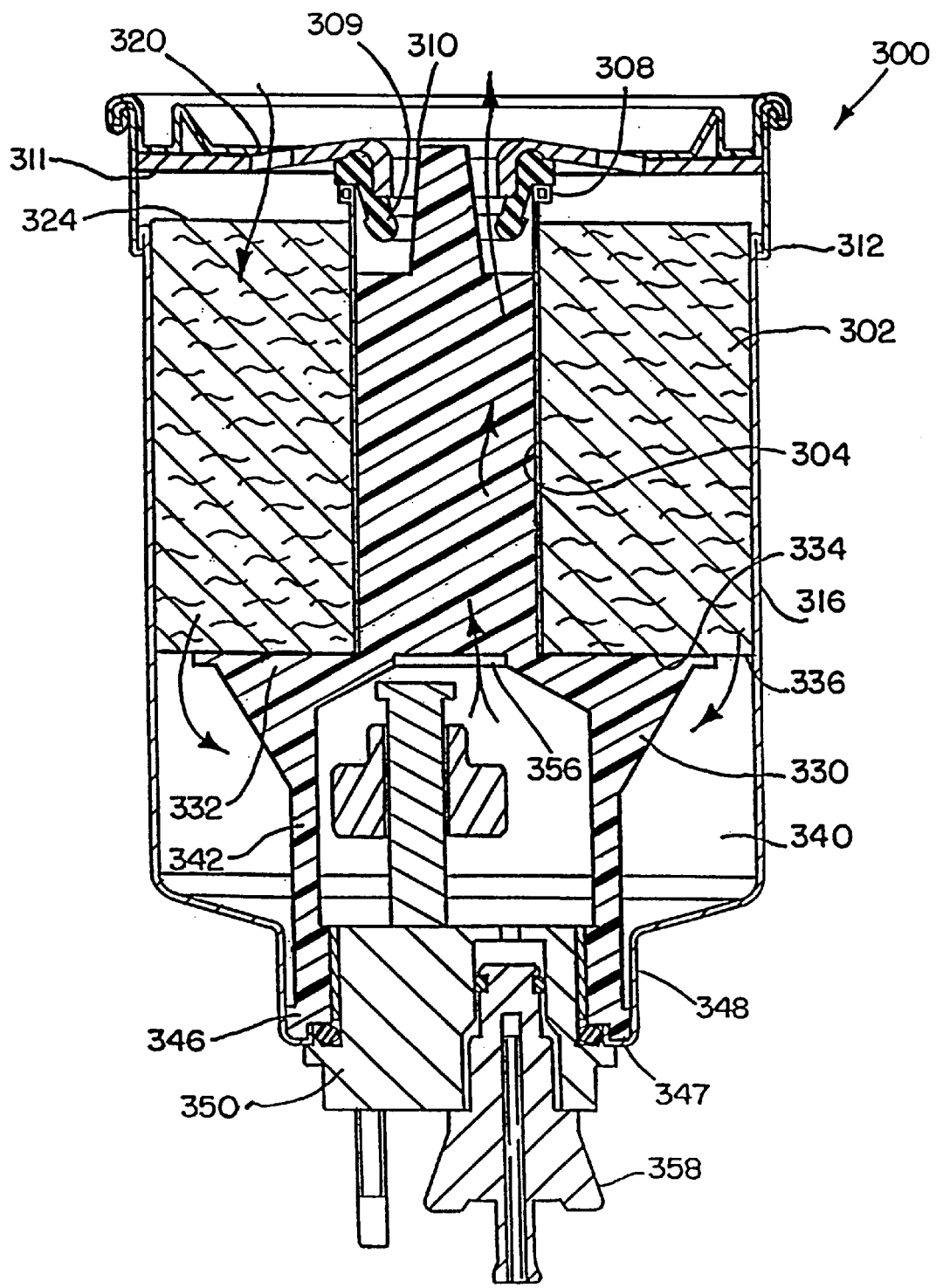
FIG. 19 is a still further form of the filter element constructed according to the first embodiment.

A still further form of a filter element 300 suitable for use with a filter head similar to head 96 is shown in FIG. 19. Element 300 is similar to element 266 in FIG. 18. However, the annular filter media 302 does not have a first end cap at the upper end of the filter media. In addition, the filter media 302 is supported by and is received around a center tube or support core 304. Support core 304 is preferably an imperforate metal tube. Filter media 302 can be fixed to support core 304 in a conventional manner, such as with an adhesive material applied between the inside surface of media 302 and the outside surface of core 304 to provide an inner fluid seal between the core and the media. Support core 304 includes an upper annular end opening 308 extending beyond the upper surface of the filter media. The annular end opening 308 is rolled-formed so as to create an outwardly-turned annular lip. Upper end opening 308 is compressed against annular seal 309 surrounding opening 310 in the tap plate 311.

A seal 312 such as an O-ring or a bead of adhesive or sealant is disposed around the inside surface of housing 316 toward the upper portion of media 302 after the media is located in the housing. The seal 312 provides an outer fluid seal between the housing and the media. Fluid entering holes 320 in tap plate 311 is directed into the upper surface 324 of media 302 and flows downwardly through the media material.

Media 302 is supported at its lower end within housing 316 by end member 330. End member 330 includes an annular, flat, radially-projecting cap portion 332 with an upper surface which is in surface-to-surface contact with the lower surface of media 302. Adhesive or potting compound can be provided between the cap portion 332 and media 302. Cap portion 332 projects outwardly toward the periphery of the media. An annular gap 336 is provided between the peripheral portion of the cap portion 332 and the peripheral portion of the media 302 to allow fluid to flow downwardly from the media 302 into lower annular chamber 340.

Figure 21:
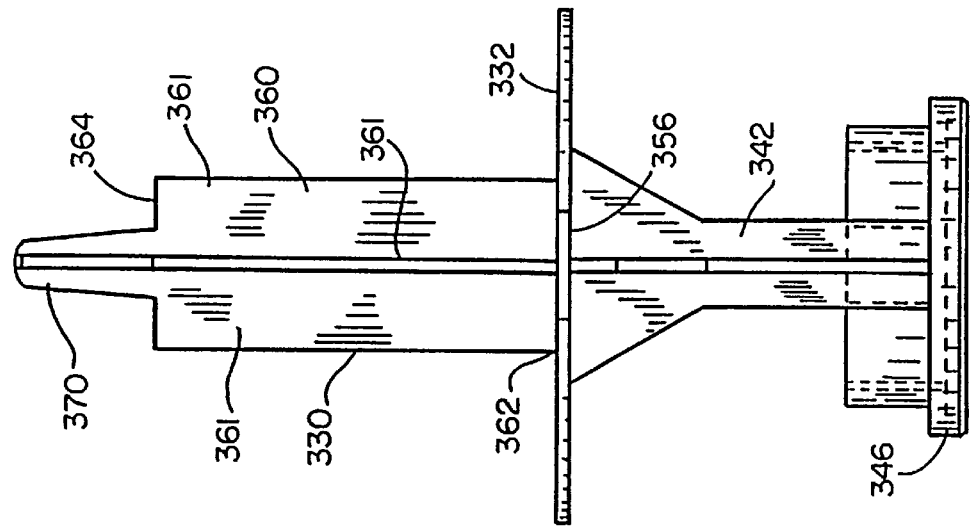
FIG. 21 is a side view of the element support of FIG. 20.
Figure 20:
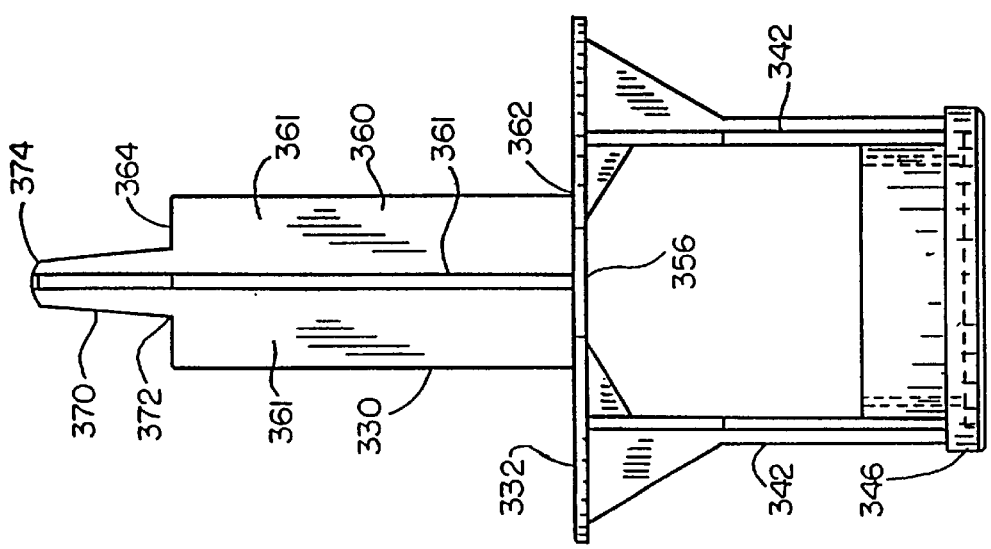
FIG. 20 is a front view of an element support for the filter element of FIG. 19.

As show in FIGS. 20 and 21, end member 330 includes a pair of support legs 342 extending downwardly from cap portion 332 through chamber 340 to a lower ring-shaped member 346. Ring-shaped member 346 is supported by annular in-turned lip 347 of longitudinally-extending wall portion 348. Ring-shaped member 346 is internally threaded for receipt of threads on bottom cap 350 in the same manner as ring-shaped member 252 illustrated in FIG. 11.

Fluid received from media 302 flows around supporting legs 342 in chamber 340 and upwardly through an aperture 356 formed centrally within cap portion 332. Contaminants in the fluid can generally settle out and collect in chamber 340 in the lower portion of the housing to be drawn off by drain valve 358.

A wall 360 extends longitudinally upward from cap portion 332 centrally within support core 304, and is surrounded by media 302. Wall 360 preferably includes four identical flat panels 361 disposed 90° apart from one another and extending parallel to the longitudinal axis of the housing. The panels 361 have parallel straight side edges 362 which are dimensioned to be closely received within support core 304. The panels 361 define flow paths or channels which allow fluid to flow upwardly from aperture 356 in cap portion 332 toward opening 310 in a tap plate 311.

Wall 360 also includes a central portion 364 which spans the upper end of wall 360. A projection 370 extends longitudinally away from central portion 364 of the wall 360 toward opening 310. Projection 370 has a free end 374 which is spaced from wall 360, and as illustrated in FIG. 19, is preferably surrounded by seal 309. Projection 370 is also preferably formed from four longitudinally-extending flat panels 375 similar to panels 361, although smaller in radial dimension. Fluid flowing between panels 361 in wall 360 can flow around and between panels 375 to opening 310 in tap plate 311.

End member 330, including wall 360, projection 370, cap portion 332, legs 342 and ring-shaped member 346 are preferably formed in one piece together from an appropriate material such as plastic, although these components could also be formed separately and attached together such as with adhesive. While the wall 360 is described above as having an "X" shape in cross-section, this wall could also be an annular wall as described previously with respect to elements 98 and 266. In this case, the annular wall would surround aperture 356 and allow fluid to flow centrally within the wall past the upper projection. The central portion supporting the projection would be similar to wall 220 in FIG. 11 and include fluid passages to allow fluid to flow to opening 310.

The axial length of wall 360 of the end member may be tailored to the length of the nipple portions in various filter heads. Again, by varying the length of wall 360 the invention insures that only the proper filter element type will work with the head in the fuel system. Further, element 300 provides all the other advantages associated with elements 266 and 98 which were previously described.

Figure 22:
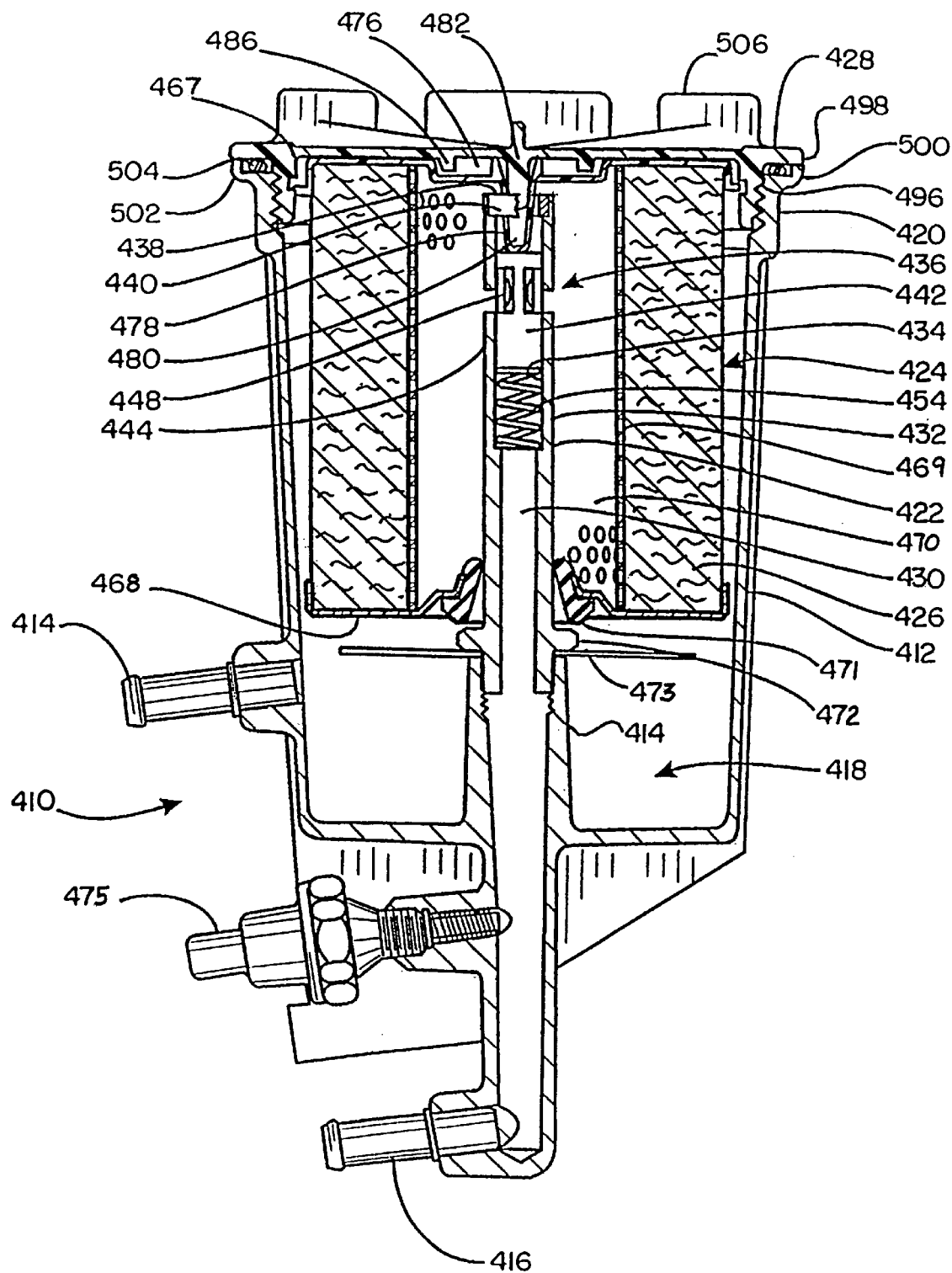
FIG. 22 is a cross-sectional view of the fuel filter with removable filter element constructed according to a second embodiment of the present invention.

Referring now to the drawings and particularly to FIG. 22, there is shown a second embodiment of the fuel filter of the present invention, indicated generally at 410. The fuel filter includes a generally cylindrical housing 412. The housing 412 includes an inlet port 414 and an outlet port 416.

Inlet port 414 is in direct fluid communication with a chamber 418 in said housing. Chamber 418 is a generally cylindrical chamber having a circular opening (not separately shown) at its upper end 420. Outlet port 416 is in direct fluid communication with a standpipe 422. Standpipe 422 is generally centered in chamber 418.

A replaceable filter element 424 is removably mounted in chamber 418. Filter element 424 includes a ring of media 426 in generally surrounding relation of standpipe 422. Media 426 may be one of several types of media material adapted for removing impurities from fuel that passes therethrough. In the preferred form of the invention, fuel passes through the media 426 in an outside-in flow pattern. However, in other embodiments of the invention an inside-out flow pattern may be used.

The fuel filter further includes a cover 428 adapted for closing the opening to chamber 418. Cover 428 is further adapted for selectively latching the cover and filter element 424 together as later explained.

The standpipe 422 includes an internal flow passage 430 in fluid communication through the housing with outlet port 416. The standpipe 422 includes a cylindrical wall 432 which has a cylindrical interior surface 434 adjacent its upper end. A pair of radially-extending openings 436 extend through wall 432 of the standpipe. The standpipe also includes an actuator opening 438 in its top end. Actuator opening 438 is bounded by a guide ring 440.

According to one form of this embodiment, a flow element 442 is mounted for longitudinal movement in standpipe 422. As shown in FIGS. 24 and 25, a flow element 442 has a lower cylindrical portion 444 bounded by a cylindrical element wall 446. Element 442 further includes a head portion 448 which has a flat, solid, top portion 450.

Flow element 442 further includes cross members 451 that bound flow cavities 452. Cross members 451 extend through the element to top portion 450. Wall 446 terminates at the head portion, however, and enables fluid access to the flow cavities 452 between the cross members. Cross members 451 also includes cut-outs 453 in the head portion to facilitate fluid flow into flow cavities 452.

Flow element 442 is sized so that cylindrical wall 446 and top portion 450 are in close-fitting, movable relation with interior surface 434 of standpipe 422. The flow element 442 is thereby made longitudinally movable inside the standpipe. A spring 454 mounted in standpipe 422 serves as biasing means for biasing the flow element in the outward direction toward actuator opening 438. Guide ring 440 serves to prevent flow element 442 from passing out of the standpipe through the actuator opening.

Flow element 442, the standpipe 422, and the openings therein 436, operate together as valve means to control fluid communication between the chamber inside the housing and the interior of the standpipe. When head portion 448 of the flow element is adjacent openings 436 of the standpipe as shown in FIG. 22, the flow passages 436, which enable fluid to be admitted to the standpipe, are aligned with cut-outs 453 in the head portion. Fuel flows into the standpipe and passes through cavities 452 in the flow element, and eventually passes to the outlet port 416 of the assembly. However, when the flow element is disposed upward from the position shown in FIG. 22, the cylindrical portion of the flow element is disposed with its cylindrical element wall adjacent and in blocking relation to openings 436. As a result, flow between the standpipe and the surrounding chamber is blocked.

Figure 26:
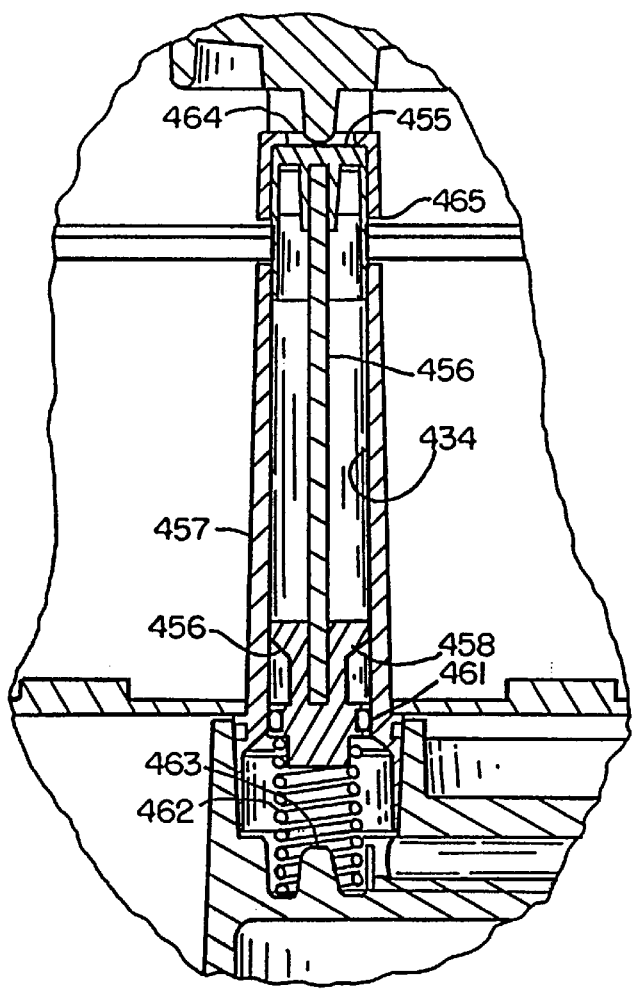
FIG. 26 is a cross-sectional view of another form of the standpipe and flow element for the fuel filter of FIG. 22.
Figure 27:
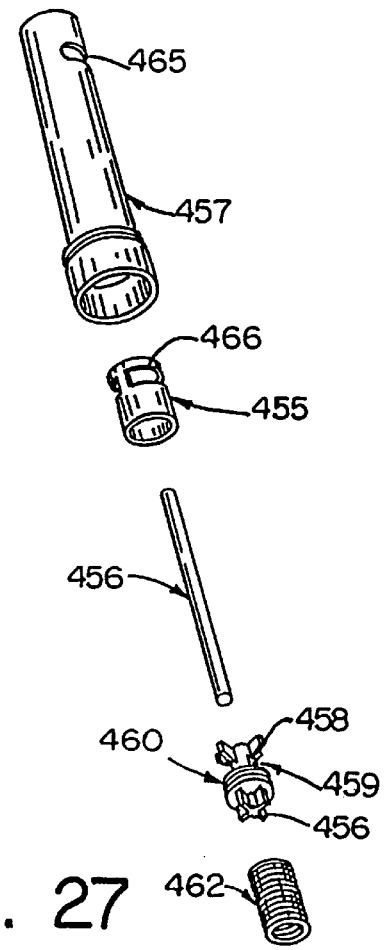
FIG. 27 is an exploded isometric view of the standpipe and flow element of FIG. 26.

An alternative form of the flow element and standpipe assembly is shown in FIGS. 26 and 27. In this form, flow element 455 receives one end of a rigid valve pin or rod 456 which extends longitudinally within standpipe 457. The other end of valve pin 456 is received within a valve element 458. Valve element 458 has a plurality of outwardly-extending fins 459 which are sized so as to guide the valve element within the interior surface of standpipe 457. The valve element also has a cylindrical lower portion 460 in close relation with the interior surface of standpipe 457. An O-ring 461 (FIG. 26) is received within a groove formed circumferentially around lower cylindrical portion 460 for providing a fluid-tight seal between valve element 458 and standpipe 457. Spring 462 located around nub 463 in the flow path to the outlet port provides a biasing means for biasing valve element 458, and hence flow element 455 toward the actuator opening 464 in the upper end of the standpipe.

When the flow element is disposed upward in the position shown in FIG. 26, the flow element blocks the openings 465 into standpipe 457. Valve element 458 also seals within standpipe 457 to prevent leakage down through the standpipe to the outlet port. However, when the flow element is in the position shown in FIG. 22, the valve element 458 is urged against spring 462 until cut-outs 466 in flow element 455 are aligned with openings 465 in standpipe 457 and lower cylindrical portion 460 clears the end of the standpipe to allow fluid to flow through the standpipe past (between) fins 459 to the outlet port.

Referring again to FIG. 22, filter element 424 includes a first imperforate end cap 467 at its upper end, and a second imperforate end cap 468 at its lower end. The end caps 467 and 468 are attached in fluid-tight relation to the ring of filter media 426 in a conventional manner using potting compound or similar adhesive material. The filter element further includes a perforated tube 469 at the inner surface of the media. The perforated tube provides support for the media and aids in preventing collapse due to pressure forces. The perforated tube 469 bounds an area 470 inside the element adjacent to the standpipe.

Lower end cap 468 includes a central opening (not separately shown) which accepts the standpipe 422 therein. A seal 471 extends across the opening to the outer surface of the standpipe to seal area 470 against infiltration of contaminates. An enlarged area 472 of the standpipe serves to hold a disc-shaped heater plate 473 in position between the standpipe and a nipple portion 474 of the housing. Heater plate 473 is adapted for mounting electronic heating elements such as PTC heaters thereon. Such heaters are useful for heating fuel in cold temperatures, particularly diesel fuel. The housing also includes a temperature sensor 475 for sensing the temperature of fuel that is passing to the outlet port. Sensor 475 enables the use of electrical control systems known in the prior art for controlling the heating elements.

Upper end cap 467 includes a centrally positioned cylindrical well area 476. A first projection 478 extends longitudinally inward from the bottom of the well area. As shown in FIG. 22, first projection 478 is adapted for extending through actuator opening 438 to engage flow element 422.

A first recess 480 is positioned in overlying relation on the upper surface of the end cap above projection 478. A cover projection 482 is positioned centrally on an interior cover top wall 484 of cover 428 (see FIG. 23). Cover projection 482 is adapted to be accepted into recess 480 and serves as support means for supporting projection 478. While cover projection 482 is adapted for adding strength to projection 478, it is of insufficient length to engage flow element 442.

Cover 428 also includes a circular centering wall 486 which extends in surrounding relation to cover projection 482. Centering wall 486 is sized to be accepted into the well area 476 on the first end cap 461.

First end cap 467 further includes a pair of laterally-extending projections 488. Projections 488 are adapted for engaging T-shaped recesses 490 in a longitudinally-extending cover wall 492 of cover 428. As shown in FIG. 23, recesses 490 have both a longitudinally-extending portion and an arcuately extending portion. The arcuately extending portion extends in both angular directions from the longitudinal extending portion. As a result, projections 488 and recess 490 are enabled to serve as latching means for latching the filter element 424 by its end cap 467 to cover 428.

Cover 428 further includes an outwardly-threaded portion 494 which is adapted for engaging inwardly threaded portion 496 adjacent the opening to chamber 418. Cover 428 further includes a radially-extending flange portion 498 which is adapted for engaging a lip portion 500 of the housing. Lip portion 500 includes a circumferentially-extending recess 502 for housing a resilient seal 504. Seal 504 holds the cover and the housing in fluid-tight relation when the cover is installed thereon. Cover 428 also includes outward-extending wing projections 506 which facilitate manually holding and turning the cover.

Although not shown in FIG. 22, the fuel filter assembly of the present invention also includes a drain valve of conventional construction which is adapted for enabling the removal of contaminants that collect in a lower portion of chamber 418. Such drain valves, which are well known in the prior art, may be periodically opened to release collected contaminants, which most commonly include water and dirt particles.

In operation, fuel flows into inlet port 414 and enters chamber 418. Fuel then passes through media 426 of the filter element 424 and is cleansed of impurities. The clean fuel travels to area 470 adjacent to the standpipe and passes through openings 436. The fuel then passes through the flow cavities 452 of the flow element 442, through the flow passage 430 of the standpipe and leaves the housing through outlet port 416.

An element change is accomplished by turning cover 428 in a counter-clockwise direction so that threaded portions 494 and 496 of the cover and housing respectively, cause filter element 424 to move upward. As the end cap 467 of filter element 424 moves upward with the cover, first projection 478 retracts out of actuator opening 438. This enables flow element 442 to move upward, so that its cylindrical lower portion 444 is in blocking relation with openings 436. Further outward movement of flow element 442 is prevented by its engagement with guide ring 440.

The turning of cover 428 also causes projections 488 to enter the arcuately extending portions of recesses 502 and engage the wall bounding the recesses due to the frictional force of seal 471 acting on the standpipe. With the projections 488 moves into the arcuate extending portions of recesses 490, the element 424 and the cover 428 are temporarily latched together. The cover 428 is turned until the threaded portion of the cover is disengaged from the housing and the element is removed from chamber 418 by moving the cover upward.

Removing the element with the cover, avoids skin contact with the fuel. Also, as dirt falls off the outside surface of the element, it does not fall into openings 436 because they are closed by element 442 and because the openings extend radially through the standpipe.

The cover 428 and the element 424 are unlatched once the element has been removed from the housing by relative movement of the element in the counter-clockwise direction. Such movement enables projections 488 on the element to pass out of the arcuately extending portions of the recesses 490 and into the longitudinally-extending portions. Once the projections 488 are in the longitudinally-extending portions of the recesses 490, the cover and element may be readily separated.

A new filter element is latched to the cover 428 by insertion of the projections 488 on the end cap 467 into the longitudinally-extending portions of the recesses 490. Thereafter the element is moved inward in the recesses until the projections 488 are aligned with the arcuately extending portions of the recesses. Twisting the element in a rotational direction, preferably clockwise, engages the projections 488 in the arcuately extending portions of the recesses.

The element is then installed in chamber 418 by inserting standpipe 422 into the opening in the lower end cap 462. The element is then moved downward. As this is done, seal 471 on the lower end cap wipes away impurities from the standpipe and keeps dirty fuel away from area 470 inside the element.

Further movement of element 424 into the chamber causes first projection 478 to enter actuator opening 438. Projection 478 engages and moves flow element 442 downward to again open openings 436 as shown in FIG. 22. Because projection 478 is reinforced by cover projection 482, it has sufficient strength to move the flow element against the biasing force of spring 454 even though the end cap 467 is of relatively flexible material, which by itself would not have sufficient strength.

The cover 428 is then threadably engaged with the housing until the flange portion 498 on the cover abuts lip portion 500 of the housing. In this position, seal 504 maintains the cover and housing in fluid-tight relation An alternative cover and element assembly is shown in FIGS. 28–31. The alternative cover and element is suitable for use with housing 412 but includes alternative latching means for latching the element and cover in engaged relation.

Figure 28:
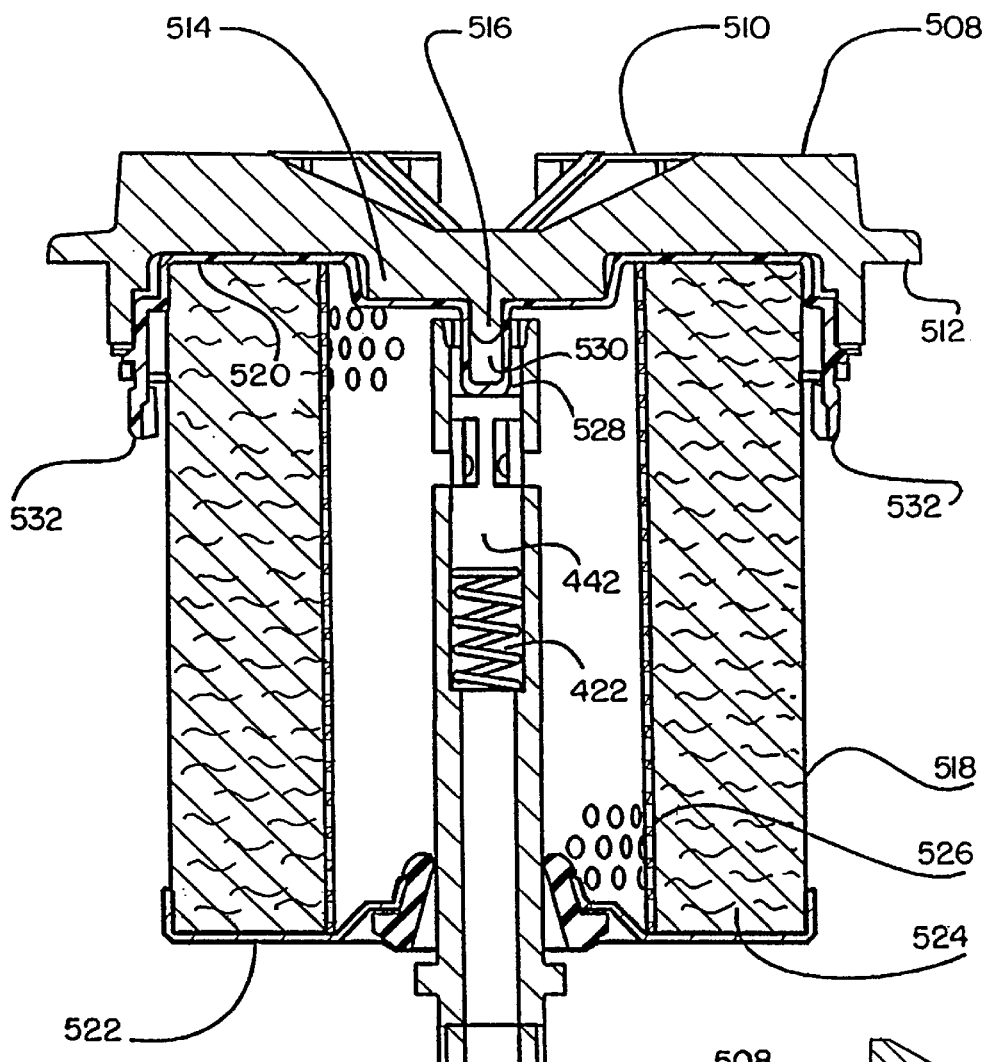
FIG. 28 is a cross-sectional view of a further form of the filter element and cover assembly constructed according to the second embodiment of the present invention.

As shown in FIG. 28, an alternative cover 508 includes manually engageable wing projections 510 on an upper surface thereof. Cover 508 includes a flange portion 512 for engaging lip portion 500 of the housing. Cover 508 includes a downward centering projection 514 from which a cover projection 516 extends.

An alternative element 518 includes a first end cap 520 and a second end cap 522. Media 524 supported on a perforated tube 526 extends between the end caps in the manner of the previously described embodiment. Second end cap 522 includes an opening and seal for accepting standpipe 422 in the same manner as second end cap 468.

First end cap 520 includes a projection 528 and an overlying access 530. Recess 530 accepts cover projection 516 therein and projection 528 engages flow element 442 in a manner previously described.

Figure 29:
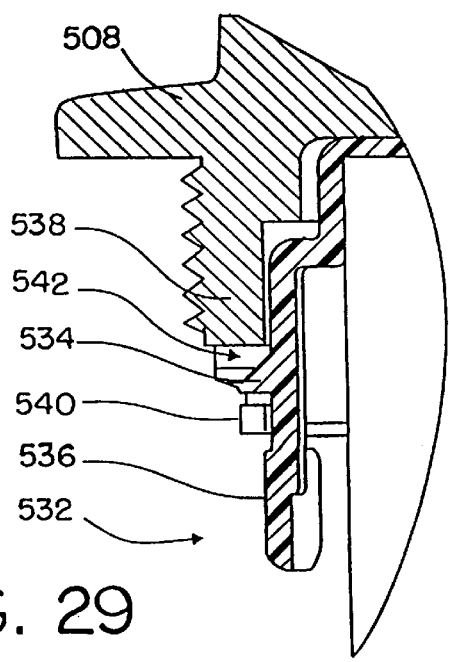
FIG. 29 is an enlarged view of the latching portions of the filter element and cover shown in FIG. 28.
Figure 30:
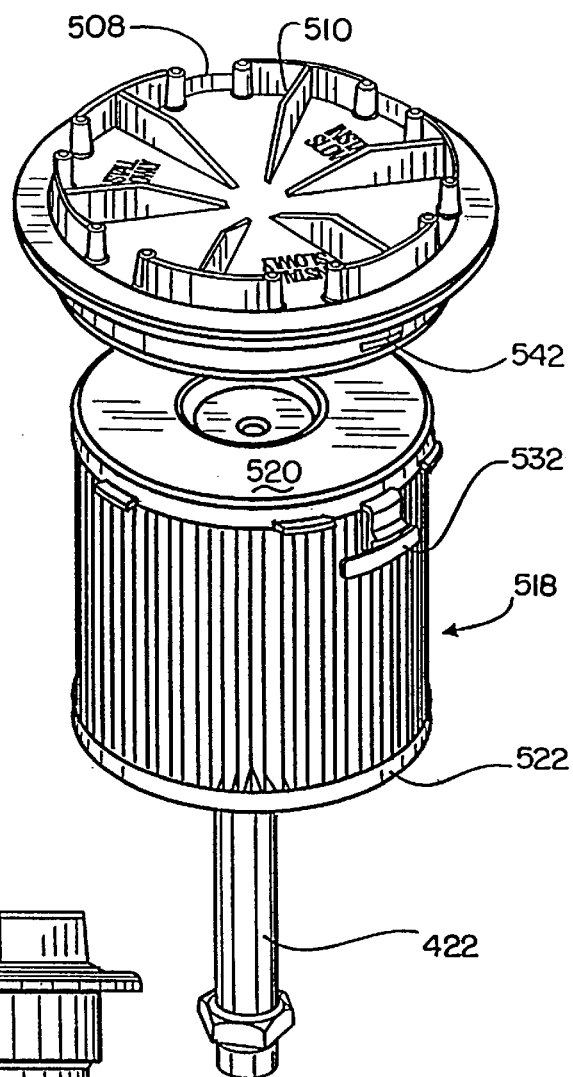
FIG. 30 is an exploded isometric view of the filter element and cover shown in FIG. 28.
Figure 31:
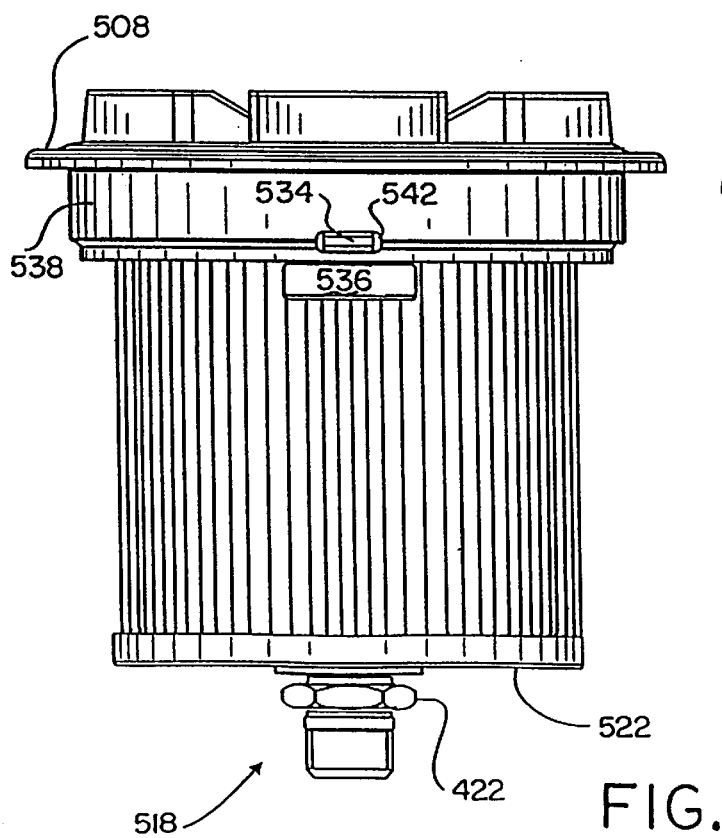
FIG. 31 is a right side view of the filter element and cover assembly shown in FIG. 28.

First end cap 520 includes a pair of oppositely spaced fingers 532. As best shown in FIGS. 29 and 30, latching fingers 532 extend axially and are disposed from the outer surface of the filter media. Fingers 532 include a tapered outward-extending locking portions 534 and arcuately extending, manually engageable flats 536.

Cover 508 includes a downward extending circular wall 538 which bounds an interior recess into which first end cap 520 and the adjacent area of element 508 is accepted. The outer surface of wall 538 is threaded and engages the threaded portion 496 of housing 412.

Wall 538 includes in cross section a tapered end portion 540. Tapered end portion 540 includes a pair of openings 542 therethrough. Openings 542 are sized for accepting the locking portions 534 of latching fingers 532 therein.

The latching fingers 532 and openings 542 provide for engagement of cover 508 and element 518. To engage the element and cover, upper end cap is pushed into the recess bounded by wall 538 with the openings 542 aligned with locking portions 534. As the element is pressed into the recess, the fingers are deformed inward until the locking portions snap into place in the openings. The cover may then be used to install the element in the housing in the same manner as described previously.

Removal of the element from the housing is accomplished by rotating cover 508 to disengage the threads of the cover and the housing. The element is removed from the housing with the cover. The cover and element are disengaged by pressing radially inward on the flats 536 of fingers 532. This deforms the fingers and causes the locking portions to move to disengage openings 542. This enables the cover to be separated from the element, and the spent element can be held by fingers until it is deposited in a receptacle for disposal. A new element is then snapped onto the cover.

The solid engagement of the cover and element achieved by the latching fingers avoids accidental disengagement of the cover and element during installation and removal of the element from the housing. However, the latching fingers also enable ready disengagement of the element and cover without the need to contact the fuel.

The preferred embodiment of the present invention enable use of the cover to remove and install the element even though it is not a permanent part thereof. This reduces the amount of material that must be discarded with a spent element. Further, because the cover provides support for the first end cap of the element, the upper end cap may be made of relatively thin flexible material which further reduces waste and cost.

A further advantage of the invention is that the assembly cannot be readily operated without the element present. This is because the cover projection is not long enough to engage the flow element. The construction of the present invention further avoids confusion because the element can only be installed one way, and the means for latching the cover and element together are easy to use.

Other embodiments of the fuel filter assembly with a removal element of the present invention, may be used with filters that have inside-out flow configurations. This may be advantageous particularly when the inlet port of the housing is under pressure. In such applications, the flow element may be used to prevent the introduction of additional fuel into the chamber during removal of the element which minimizes spillage.

Figure 32:
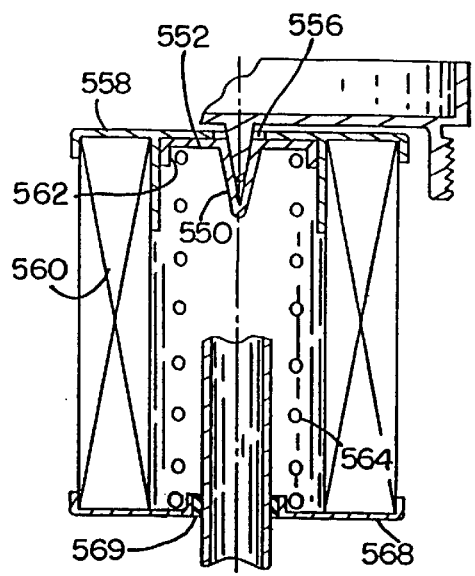
FIG. 32 is a cross-sectional view of a further form of the actuating projection for the filter element for either of the embodiments of the present invention.

A further form of the actuating projection of the filter element for the fuel filter which is applicable to either of the previous embodiments is illustrated in FIG. 32. In this form, the actuating projection 550 extends longitudinally from a central disk-shaped portion 552 which spans a central opening 556 in the upper end cap 558 for media ring 560. A means is provided for fixing central disk-shaped portion 552 (and hence projection 550) to upper end cap 558. One such means is an annular flange 562 surrounding the periphery of disk-shaped potion 552 which provides a cup-shaped spring seat for a compression spring 564. Flange 562 fits closely within media ring 560. Compressor spring 564 extends centrally within media ring 560 and bottoms against opposite second end cap 568 on the opposite end of media ring 560, preferably around lower annular seal 569. Spring 564 urges disk-shaped portion 552 against upper end cap 558 surrounding opening 556 and thereby fixes the projection to the end cap. The disk-shaped portion 552 could also be fixed to upper end cap 558 by other means, such as by friction-fit, adhesive or by rivets. All other aspects of this form can be the same as described previously.

A still further form of the actuating projection and valve element assembly for the fuel filter of the second embodiment described above is illustrated in FIG. 33. In this form, the first end cap 576 on one end of media ring 580 includes a first annular end cap portion 582 with an annular flange 586 formed preferably in one-piece with end cap portion 582 and extending longitudinally-upward therefrom. Flange 586 contacts annular upper end wall 588 of the filter housing 589 when the element is located within the housing. Upper end wall 588 can be secured to the filter housing such as with a threaded bolt 590 inserted through a central opening in the end wall and into a threaded bore in standpipe 591. Upper end cap portion 582 further includes an annular portion 592 extending radially inward from the media ring which terminates in an annular resilient wiper seal 593. Wiper seal 593 receives and seals against standpipe 591 when the element is located within the housing.

First end cap 576 further includes a second annular end cap portion 595 disposed between first end cap portion 582 and the upper end surface of media ring 580. Second end cap portion includes a central annular portion 597 extending radially-inward from the media ring 580. Central portion 597 has one or more openings to enable fluid to pass radially-inward from media ring 580 to chamber 598. Central portion 597 also has a portion which extends longitudinally downward along the central axis of the housing to provide an actuating projection 599. Actuating projection 599 includes a central circular opening at the tip of the projection which receives standpipe 591. Second end cap portion 595 includes a lower flat surface which can be bonded such as with adhesive to the upper end surface of the media ring. The second end cap portion can also be bonded to the first end cap portion 582 such as with adhesive.

A second end cap 600 is bonded to the lower end surface of media ring 580. Second end cap 600 includes an annular end wall 602 spaced radially inward from media ring 580 and extending longitudinally upward within the media. Annular end wall 602 includes an annular resilient wiper seal 604 at its upper distal end which seals against the radially enlarged portion of standpipe 591, preferably above housing nipple portion 605.

In this form of the invention, standpipe 591 can have a valve element 610 which is provided exterior to the standpipe. Valve element 610 has a cylindrical imperforate body 612 which closely receives standpipe 591, and is movable along an upper radially-smaller portion of the standpipe. Body 612 includes a radially-outward projecting annular flange or lip 614 at its upper end. A compression spring 619 contacts the lower surface of flange 614 and urges valve element 610 upwardly along the standpipe. Spring 619 is supported against shoulder 617 formed between the upper radially-smaller portion of the standpipe and a lower radially-enlarged portion of the standpipe. A circumferential ridge 618 is provided toward the top of the standpipe as an upper stop to prevent further upward movement of the cylindrical body 612.

Figure 33:
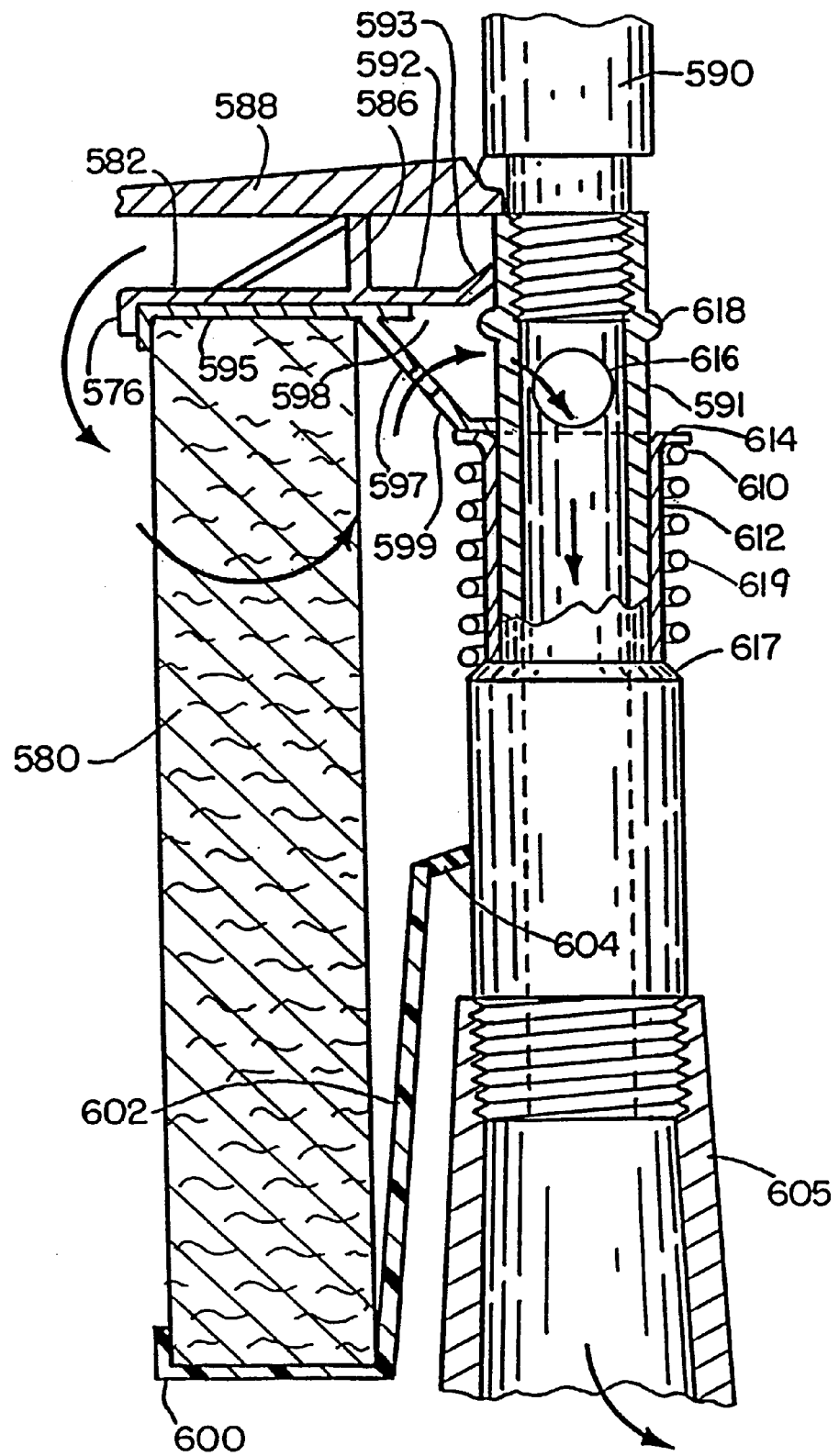
FIG. 33 is a cross-sectional side view of a further form of the actuating projection and valve element assembly according to the second embodiment of the present invention.

In the position illustrated in FIG. 33, upper end cap 576 is urged downwardly by upper end wall 588 contacting flange 586 when the upper end wall is assembled with the filter housing. Projection 599 contacts flange 614 and urges valve element 610 downwardly against its spring bias to exposed flow openings 616 in standpipe 591. Upper wiper seal 593 and lower wiper seal 604 seal against the respective housing components. Fluid is directed into the housing and passes radially inward through media 580 to chamber 598. Fluid then flows from chamber 598 through openings 616 to the outlet port (not shown). When the filter element is removed, spring 616 urges valve element 610 upwardly until body 612 contacts ridge 617 to cover flow openings 616 and thereby block fluid flow to the outlet port.

Thus, the new fuel filter and priming pump of the present invention achieves the above-stated objectives, eliminates difficulties encountered in the use of prior devices, solves problems and attains the desirable results described herein.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A replaceable filter element removeably positionable within a housing composed of mating parts forming an interior enclosure for the filter element, said filter element comprising:

a continuous ring of filter media circumscribing a longitudinal axis, said ring having an interior surface bounding an interior area and first and second ends, a first end cap, said first end cap including an annular end cap portion disposed against the first end of the filter media ring in adhesively-bonded, fluid-tight relation thereto, said annular portion defining a second central opening, and a central disk-shaped portion, separate from and movable with respect to said annular end cap portion, spanning the annular end cap portion and supported by said annular end cap portion, said disk-shaped portion having an annular surface portion in surface-to-surface engagement with a surface portion of the first end cap surrounding the second central opening, said first end cap preventing fluid flow through the first end of the filter media ring;

a second end cap longitudinally disposed from said first end cap and disposed against the second end of said media ring in adhesively bonded, fluid-tight relation thereto, said second end cap having a first central opening therethrough axially aligned with said longitudinal axis allowing access into said interior area;

said first end cap farther including a projection in said interior area extending longitudinally along said longitudinal axis away from said first end cap toward tie second end cap, said projection including a base end directly fixedly joined to said central portion of said first end cap radially-inward from the interior surface and independently of the mating part of the housing that would be adjacent to said first end cap, and a distal free end terminating at a point closer to said first end cap than said second end cap, said projection radially disposed inwardly of said interior surface, smaller in transverse cross-section than said first central opening, and longer than it is wide, said projection further including a tubular wall forming a portion of a recess that opens away from said interior area to an axially outer side of said wall of said first end cap.

2. The filter element as in claim 1, wherein said projection is formed as a single unitary piece with said central portion of said first end cap.

3. The filter element as in claim 1, wherein said disk-shaped portion is fixed to said first end cap.

4. The filter element as in claim 1, further including means for fixing said disk-shaped portion to said first end cap.

5. The filter element as in claim 1, wherein a compression spring disposed between said first and second end caps fixes the disk-shaped portion to the annular end cap portion.

6. A filter assembly comprising the filter element according to claim 1, and a housing composed of mating parts forming an interior enclosure for the filter element.

7. The filter element as in claim 1, wherein said central portion includes an annular flange on an inner surface facing the first central opening, said flange extending around an outer peripheral edge of the disk-shaped portion and providing a spring seat for the compression spring.

8. A replaceable filter element removably positionable within a housing composed of mating parts forming an interior enclosure for the filter element, said filter element comprising:

a continuous ring of filter media circumscribing a longitudinal axis, said ring having an interior surface bounding an interior area and first and second ends, a first end cap, said first end cap including an annular end cap portion disposed against the first end of the filter media ring in adhesively-bonded, fluid-tight relation thereto, said annular portion defining a second central opening, and a central disk-shaped portion, separate from and movable with respect to said annular end cap portion, spanning the annular end cap portion and fixed to said annular end cap portion, said disk-shaped portion having an annular surface portion in surface-to-surface engagement with a surface-portion of the first end cap surrounding the second central opening, said first end cap preventing fluid flow through the first end of the filter media ring;

a second end cap longitudinally disposed from said first end cap and disposed against the second end of said media ring in adhesively bonded, fluid-tight relation thereto, said second end cap having a first central opening therethrough axially aligned with said longitudinal axis allowing access into said interior area;

said first end cap further including a projection in said interior area extending longitudinally along said longitudinal axis away from said first end cap toward the second end cap, said projection including a base end directly fixedly joined to said central portion of said first end cap radially-inward from the interior surface and independently of the mating part of the housing that would be adjacent to said first end cap, and a distal free end terminating at a point closer to said first end cap than said second end cap, said projection radially disposed inwardly of said interior surface, smaller in transverse cross-section than said first central opening, and longer than it is wide, said projection further including a tubular wall forming a portion of a recess that opens away from said interior area to an axially outer side of said wall of said first end cap.

9. A filter assembly comprising the filter element according to claim 8, and a housing composed of mating parts forming an interior enclosure for the filter element.

10. A replaceable filter element removably positionable within a housing composed of mating parts forming an interior enclosure for the filter element, said filter element comprising:

a continuous ring of filter media circumscribing a longitudinal axis, said ring having an interior surface bounding an interior area and first and second ends, a first end cap, said first end cap including an annular end cap portion disposed against the first end of the filter media ring in adhesively-bonded, fluid-tight relation thereto, said annular portion defining a second central opening, and a central disk-shaped portion separate from and removable with respect to said annular end cap portion, spanning the annular end cap portion and sealably connected to said annular end cap portion, said disk-shaped portion having an annular surface portion in surface-to-surface engagement with a surface portion of the first end cap surrounding the second central opening said first end cap preventing fluid flow through the first end of the filter media ring;

a second end cap longitudinally disposed from said first end cap and disposed against the second end of said media ring in adhesively bonded, fluid-tight relation thereto, said second end cap having a first central opening therethrough axially aligned with said longitudinal axis allowing access into said interior area;

said first end cap further including a projection in said interior area extending longitudinally along said longitudinal axis away from said first end cap toward the second end cap, said projection including a base end directly fixedly joined to said central portion of said first end cap radially-inward from the interior surface and independently of the mating part of the housing that would be adjacent to said first end cap, and a distal free end terminating at a point closer to said first end cap than said second end cap, said projection radially disposed inwardly of said interior surface, smaller in transverse cross-section than said first central opening, and longer than it is wide, said projection further including a tubular wall forming a portion of a recess that opens away from said interior area to an axially outer side of said wall of said first end cap.

11. A filter assembly comprising the filter element according to claim 10, and a housing composed of mating parts forming an interior enclosure for the filter element.

* * * * *